United States Patent
Govindan et al.

(10) Patent No.: US 9,969,638 B2
(45) Date of Patent: May 15, 2018

(54) WATER TREATMENT SYSTEMS AND ASSOCIATED METHODS

(71) Applicant: Gradiant Corporation, Woburn, MA (US)

(72) Inventors: Prakash Narayan Govindan, Melrose, MA (US); Steven Lam, Medford, MA (US); Maximus G. St. John, Boston, MA (US)

(73) Assignee: Gradiant Corporation, Woburn, MA (US)

( * ) Notice: Subject to any disclaimer, the term of this patent is extended or adjusted under 35 U.S.C. 154(b) by 407 days.

(21) Appl. No.: 14/452,387

(22) Filed: Aug. 5, 2014

(65) Prior Publication Data

US 2015/0060286 A1    Mar. 5, 2015

Related U.S. Application Data

(60) Provisional application No. 61/988,034, filed on May 2, 2014, provisional application No. 61/908,263, filed
(Continued)

(51) Int. Cl.
*B01D 61/04* (2006.01)
*B01D 61/16* (2006.01)
(Continued)

(52) U.S. Cl.
CPC ............ *C02F 9/00* (2013.01); *B01D 61/04* (2013.01); *B01D 61/16* (2013.01); *B01D 65/08* (2013.01);
(Continued)

(58) Field of Classification Search
CPC .. B01D 1/0011; B01D 1/0041; B01D 1/0047; B01D 1/0094; B01D 1/30; B01D 3/00; B01D 3/007; B01D 5/0033; B01D 5/0054; B01D 5/0078; B01D 65/08; B01D 11/04; B01D 11/0415; B01D 11/0419;
(Continued)

(56) References Cited

U.S. PATENT DOCUMENTS 2,151,990 A    3/1939  Ruys
2,606,820 A    8/1952  Viggo
(Continued)

FOREIGN PATENT DOCUMENTS

CA    2 779 732 A1   12/2012
CA    2818055        11/2013
(Continued)

OTHER PUBLICATIONS

Li, Experimental Analysis of Produced Water Desalination by a Humidification-Dehumidification Process. 2009. 62 pages.
(Continued)

*Primary Examiner* — Joseph Drodge
(74) *Attorney, Agent, or Firm* — Wolf, Greenfield & Sacks, P.C.

(57) ABSTRACT

Water treatment systems and associated methods are generally described. Certain of the water treatment systems and methods described herein can be used to pre-treat an aqueous stream that is subsequently transported to a desalination apparatus and/or post-treat an aqueous stream that has been produced by a desalination apparatus.

18 Claims, 5 Drawing Sheets

Related U.S. Application Data on Nov. 25, 2013, provisional application No. 61/906,620, filed on Nov. 20, 2013, provisional application No. 61/881,365, filed on Sep. 23, 2013, provisional application No. 61/862,188, filed on Aug. 5, 2013.

(51) Int. Cl.

| | | |
|---|---|---|
| B01D 65/08 | (2006.01) | |
| C02F 1/42 | (2006.01) | |
| C02F 1/44 | (2006.01) | |
| C02F 1/52 | (2006.01) | |
| C02F 1/66 | (2006.01) | |
| C02F 9/00 | (2006.01) | |
| C02F 1/38 | (2006.01) | |
| C02F 1/28 | (2006.01) | |
| C02F 1/00 | (2006.01) | |
| C02F 1/24 | (2006.01) | |
| C02F 1/20 | (2006.01) | |
| C02F 5/10 | (2006.01) | |
| C02F 101/32 | (2006.01) | |

(52) U.S. Cl.
CPC ............... *C02F 1/001* (2013.01); *C02F 1/20* (2013.01); *C02F 1/24* (2013.01); *C02F 1/28* (2013.01); *C02F 1/283* (2013.01); *C02F 1/38* (2013.01); *C02F 1/42* (2013.01); *C02F 1/44* (2013.01); *C02F 1/52* (2013.01); *C02F 1/66* (2013.01); *C02F 5/10* (2013.01); *C02F 2101/322* (2013.01); *C02F 2209/01* (2013.01); *C02F 2303/22* (2013.01)

(58) Field of Classification Search
CPC .. B01D 11/1488; B01D 17/02; B01D 17/005; B01D 17/06; B01D 61/04; B01D 61/10; B01D 61/14; B01D 61/142; B01D 61/20; B01D 61/42; B01D 61/422; B01D 61/52; B01D 61/58; B01D 2221/04; B01D 2311/04; B01D 2311/12; B01D 2311/2623; B01D 2311/2642; C02F 1/04; C02F 1/042; C02F 1/048; C02F 1/14; C02F 1/16; C02F 1/28; C02F 1/42; C02F 1/52; C02F 1/66; C02F 1/68; C02F 9/00; C02F 2303/22; E21B 21/06; E21B 21/063; E21B 21/065; E21B 21/068
USPC ............... 159/47.1; 202/172, 174, 176, 183; 203/10, 11, 21, 25; 210/696, 698, 210/182, 195.1, 663, 669, 774, 805, 806
See application file for complete search history.

(56) References Cited

U.S. PATENT DOCUMENTS

| | | | |
|---|---|---|---|
| 2,606,839 A | 8/1952 | Evans | |
| 2,640,018 A | 5/1953 | Heath | |
| 2,997,856 A | 8/1961 | Pike | |
| 3,032,482 A | 5/1962 | Shoemaker | |
| 3,042,606 A * | 7/1962 | Salutsky | C02F 5/04 |
| | | | 210/665 |
| 3,080,302 A | 3/1963 | Rogers et al. | |
| 3,236,747 A | 2/1966 | Margiloff | |
| 3,331,773 A | 7/1967 | Gunderson et al. | |
| 3,454,490 A | 7/1969 | Wallace | |
| 3,489,652 A | 1/1970 | Williamson | |
| 3,625,761 A | 12/1971 | Tate | |
| 3,725,209 A | 4/1973 | Rosa | |
| 3,926,739 A | 12/1975 | Izumi | |
| 3,992,154 A | 11/1976 | Whitbourne et al. | |
| 4,224,148 A | 9/1980 | Lindman et al. | |
| 4,251,367 A | 2/1981 | Santora | |
| 4,334,886 A * | 6/1982 | Tani | C01D 3/06 |
| | | | 159/16.1 |
| 4,452,696 A | 6/1984 | Lopez | |
| 4,511,436 A | 4/1985 | El Din et al. | |
| 4,563,337 A | 1/1986 | Kim | |
| 4,576,724 A | 3/1986 | Colman et al. | |
| 4,708,805 A | 11/1987 | D'Muhala | |
| 4,735,722 A | 4/1988 | Krepak | |
| 4,755,298 A | 7/1988 | Grinstead | |
| 4,770,775 A | 9/1988 | Lopez | |
| 4,806,244 A | 2/1989 | Guilhem | |
| 4,843,828 A | 7/1989 | Gladman | |
| 4,944,882 A | 7/1990 | Ray et al. | |
| 4,956,157 A | 9/1990 | Nasu | |
| 4,973,201 A | 11/1990 | Paul et al. | |
| 4,980,077 A | 12/1990 | Morris et al. | |
| 4,981,593 A | 1/1991 | Priestley et al. | |
| 5,015,391 A | 5/1991 | Mohn | |
| 5,190,656 A | 3/1993 | Paul et al. | |
| 5,225,087 A | 7/1993 | Kardos | |
| 5,238,574 A | 8/1993 | Kawahima et al. | |
| 5,250,185 A | 10/1993 | Tao et al. | |
| 5,282,995 A | 2/1994 | Paul et al. | |
| 5,328,616 A | 7/1994 | Martyak et al. | |
| 5,425,902 A | 6/1995 | Miller et al. | |
| 5,453,205 A | 9/1995 | Browne | |
| 5,464,540 A * | 11/1995 | Friesen | B01D 61/362 |
| | | | 210/640 |
| 5,656,161 A | 8/1997 | Solomon et al. | |
| 5,840,195 A | 11/1998 | Delsalle et al. | |
| 6,010,631 A | 1/2000 | Delsalle et al. | |
| 6,062,070 A | 5/2000 | Maltby et al. | |
| 6,113,797 A * | 9/2000 | Al-Samadi | B01D 61/022 |
| | | | 210/650 |
| 6,146,525 A | 11/2000 | Li et al. | |
| 6,187,200 B1 | 2/2001 | Yamamura et al. | |
| 6,190,556 B1 | 2/2001 | Uhlinger | |
| 6,270,671 B1 | 8/2001 | Shorr et al. | |
| 6,319,409 B1 | 11/2001 | Saitou et al. | |
| 6,416,668 B1 | 7/2002 | Al-Samadi et al. | |
| 6,423,235 B1 * | 7/2002 | Shimoi | B01D 19/0015 |
| | | | 210/760 |
| 6,440,310 B1 | 8/2002 | Shorr et al. | |
| 6,461,514 B1 | 10/2002 | Al-Samadi | |
| 6,508,936 B1 | 1/2003 | Hassan | |
| 6,582,605 B2 | 6/2003 | Krulik et al. | |
| 6,699,369 B1 * | 3/2004 | Hartman | B01D 1/18 |
| | | | 159/16.1 |
| 6,730,234 B2 | 5/2004 | Symens et al. | |
| 6,783,682 B1 | 8/2004 | Awerbuch | |
| 6,817,476 B2 | 11/2004 | Donnick et al. | |
| 6,919,000 B2 | 7/2005 | Klausner et al. | |
| 7,022,240 B2 | 4/2006 | Hart et al. | |
| 7,048,852 B2 | 5/2006 | Ballard | |
| 7,115,670 B2 | 10/2006 | Hensman et al. | |
| 7,141,171 B2 | 11/2006 | Lightfoot | |
| 7,225,620 B2 | 6/2007 | Klausner et al. | |
| 7,306,437 B2 | 12/2007 | Hauge | |
| 7,316,080 B1 | 1/2008 | Woolsey | |
| 7,459,084 B2 | 12/2008 | Baig et al. | |
| 7,459,088 B2 | 12/2008 | Davis | |
| 7,465,376 B2 | 12/2008 | Neubert et al. | |
| 7,510,656 B2 | 3/2009 | Shafer et al. | |
| 7,520,993 B2 | 4/2009 | Laraway et al. | |
| 7,527,726 B2 | 5/2009 | Slough et al. | |
| 7,597,784 B2 | 10/2009 | Bednarek et al. | |
| 7,678,235 B2 | 3/2010 | Deep et al. | |
| 7,718,069 B2 | 5/2010 | Laraway et al. | |
| 7,726,398 B2 | 6/2010 | Collins et al. | |
| 7,727,400 B2 | 6/2010 | Flynn | |
| 7,731,847 B2 | 6/2010 | Ton That | |
| 7,815,804 B2 | 10/2010 | Nagghappan | |
| 7,824,552 B2 | 11/2010 | Slabaugh et al. | |
| 7,950,921 B1 | 5/2011 | Woolsey | |
| 7,964,101 B2 | 6/2011 | Slough et al. | |
| 8,012,358 B2 | 9/2011 | Slabaugh et al. | |
| 8,043,509 B2 | 10/2011 | Thiers | |
| 8,119,007 B2 | 2/2012 | Bajpayee et al. | |
| 8,147,696 B1 | 4/2012 | Pandya | |

(56) References Cited

U.S. PATENT DOCUMENTS

| | | |
|---|---|---|
| 8,216,473 B2 | 7/2012 | Wohlert |
| 8,252,092 B2 | 8/2012 | Govindan et al. |
| 8,292,272 B2 | 10/2012 | Elsharqawy et al. |
| 8,366,924 B2 | 2/2013 | Vuong |
| 8,469,092 B2 | 6/2013 | Curole et al. |
| 8,501,007 B2 | 8/2013 | Bajpayee et al. |
| 8,523,985 B2 | 9/2013 | Govindan et al. |
| 8,562,824 B2 | 10/2013 | Thiers et al. |
| 8,678,080 B2 | 3/2014 | Curole et al. |
| 8,679,347 B2 | 3/2014 | Al-Samadi |
| 8,727,325 B2 | 5/2014 | Sparrow et al. |
| 8,771,477 B2 | 7/2014 | Thiers |
| 8,778,065 B2 | 7/2014 | Govindan et al. |
| 8,794,320 B2 | 8/2014 | Ayirala et al. |
| 8,820,723 B1 | 9/2014 | Sparrow et al. |
| 8,840,792 B2 | 9/2014 | Wohlert |
| 8,857,798 B1 | 10/2014 | Sparrow et al. |
| 8,889,000 B2 | 11/2014 | Hannemann et al. |
| 8,980,100 B2 | 3/2015 | Chidambaran |
| 8,999,172 B1 | 4/2015 | Zuback |
| 9,072,984 B2 | 7/2015 | Govindan et al. |
| 9,079,117 B2 | 7/2015 | Govindan et al. |
| 9,085,971 B2 | 7/2015 | Janssen et al. |
| 9,120,033 B2 | 9/2015 | Govindan et al. |
| 9,221,694 B1 | 12/2015 | Govindan et al. |
| 9,266,748 B1 | 2/2016 | Govindan et al. |
| 9,266,762 B2 | 2/2016 | Wang et al. |
| 9,428,404 B2 | 8/2016 | Bajpayee et al. |
| 9,550,685 B2 | 1/2017 | Klausner et al. |
| 9,556,041 B2 | 1/2017 | Govindan et al. |
| 9,617,179 B2 | 4/2017 | Govindan et al. |
| 9,700,811 B2 | 7/2017 | Govindan et al. |
| 2003/0106860 A1 | 6/2003 | Peloquin et al. |
| 2003/0132166 A1 | 7/2003 | Rey |
| 2004/0187897 A1 | 9/2004 | Kenowski et al. |
| 2005/0023222 A1 | 2/2005 | Baillie |
| 2006/0150892 A1 | 7/2006 | Mayer |
| 2006/0157409 A1 | 7/2006 | Hassan |
| 2006/0157410 A1 | 7/2006 | Hassan |
| 2007/0012556 A1 | 1/2007 | Lum et al. |
| 2007/0068791 A1 | 3/2007 | Thom et al. |
| 2007/0080113 A1 | 4/2007 | Vuong |
| 2007/0084713 A1 | 4/2007 | Deep et al. |
| 2007/0102359 A1 | 5/2007 | Lombardi et al. |
| 2007/0131428 A1 | 6/2007 | den Boestert et al. |
| 2007/0181480 A1* | 8/2007 | Lee ................. B01J 47/022 210/282 |
| 2007/0235391 A1 | 10/2007 | Ylikangas et al. |
| 2008/0073200 A1 | 3/2008 | Godshall et al. |
| 2008/0102119 A1 | 5/2008 | Grovender |
| 2008/0116134 A1 | 5/2008 | Cartwright |
| 2008/0121585 A1 | 5/2008 | Mavis |
| 2008/0277344 A1 | 11/2008 | Sengupta et al. |
| 2009/0020289 A1 | 1/2009 | Sharif |
| 2009/0032446 A1 | 2/2009 | Wiemers et al. |
| 2009/0101490 A1 | 4/2009 | Thiers |
| 2009/0101587 A1 | 4/2009 | Blokker et al. |
| 2009/0127210 A1 | 5/2009 | Swisher |
| 2009/0173096 A1 | 7/2009 | Wohlert |
| 2009/0194272 A1 | 8/2009 | Baillie |
| 2009/0218210 A1 | 9/2009 | Demmons et al. |
| 2009/0277634 A1 | 11/2009 | Case et al. |
| 2009/0277640 A1 | 11/2009 | Thompson et al. |
| 2009/0277641 A1 | 11/2009 | Walters et al. |
| 2009/0308820 A1 | 12/2009 | Thiers et al. |
| 2010/0032377 A1 | 2/2010 | Wohlert |
| 2010/0163471 A1 | 7/2010 | Elyanow et al. |
| 2010/0163472 A1 | 7/2010 | Thiers et al. |
| 2010/0242995 A1 | 9/2010 | Xiong et al. |
| 2010/0282675 A1 | 11/2010 | Sengupta et al. |
| 2010/0314238 A1* | 12/2010 | Frolov ................. B01D 1/0047 203/10 |
| 2011/0017677 A1 | 1/2011 | Evans |
| 2011/0024354 A1 | 2/2011 | Xia et al. |
| 2011/0056878 A1 | 3/2011 | Matsushiro et al. |
| 2011/0094965 A1* | 4/2011 | Al-Samadi ........... B01D 61/022 210/652 |
| 2011/0108484 A1 | 5/2011 | Liberman et al. |
| 2011/0114558 A1 | 5/2011 | Al-Mayahi et al. |
| 2011/0120157 A1 | 5/2011 | Wohlert |
| 2011/0155666 A1 | 6/2011 | Prakash et al. |
| 2011/0180479 A1 | 7/2011 | Cordatos et al. |
| 2011/0198285 A1 | 8/2011 | Wallace |
| 2011/0215039 A1 | 9/2011 | Acernese et al. |
| 2011/0257788 A1* | 10/2011 | Wiemers ............... B01D 61/022 700/267 |
| 2011/0303607 A1 | 12/2011 | Vora et al. |
| 2011/0306525 A1 | 12/2011 | Lighthelm |
| 2012/0012005 A1 | 1/2012 | Burke |
| 2012/0012511 A1 | 1/2012 | Kim et al. |
| 2012/0037568 A1 | 2/2012 | Karrs et al. |
| 2012/0067820 A1 | 3/2012 | Henthorne et al. |
| 2012/0090833 A1 | 4/2012 | Ligthelm et al. |
| 2012/0125603 A1 | 5/2012 | Willingham et al. |
| 2012/0125611 A1 | 5/2012 | Ayirala et al. |
| 2012/0125861 A1 | 5/2012 | Thiers |
| 2012/0145635 A1 | 6/2012 | Lucas, III et al. |
| 2012/0199524 A1 | 8/2012 | Bly et al. |
| 2012/0199534 A1 | 8/2012 | Holtzapple et al. |
| 2012/0205307 A1 | 8/2012 | Boudinar |
| 2012/0227975 A1 | 9/2012 | Ayirala et al. |
| 2012/0234664 A1 | 9/2012 | Nicoll |
| 2012/0234765 A1 | 9/2012 | Sengupta et al. |
| 2012/0267307 A1 | 10/2012 | McGinnis |
| 2012/0279396 A1* | 11/2012 | Brammer ............ B01D 19/0005 95/263 |
| 2012/0292259 A1 | 11/2012 | Marcin |
| 2012/0312755 A1 | 12/2012 | Ryan et al. |
| 2013/0008079 A1 | 1/2013 | Chung et al. |
| 2013/0043190 A1 | 2/2013 | Al-Samadi et al. |
| 2013/0056193 A1 | 3/2013 | Thiers |
| 2013/0074694 A1 | 3/2013 | Govindan et al. |
| 2013/0075098 A1* | 3/2013 | Janjua ..................... E21B 43/40 166/303 |
| 2013/0075940 A1 | 3/2013 | Govindan et al. |
| 2013/0092626 A1 | 4/2013 | Zimmerman et al. |
| 2013/0105323 A1 | 5/2013 | Averbeck et al. |
| 2013/0118887 A1 | 5/2013 | Frolov et al. |
| 2013/0193074 A1 | 8/2013 | Voigt et al. |
| 2013/0213892 A1 | 8/2013 | Henthorne |
| 2013/0233786 A1 | 9/2013 | Posa |
| 2013/0240442 A1 | 9/2013 | Chidambaran et al. |
| 2013/0318743 A1 | 12/2013 | Chinta et al. |
| 2014/0021135 A1 | 1/2014 | Sawyer et al. |
| 2014/0041856 A1 | 2/2014 | Janssen et al. |
| 2014/0042058 A1 | 2/2014 | Janssen et al. |
| 2014/0042061 A1* | 2/2014 | Wallace ..................... C02F 9/00 210/149 |
| 2014/0061022 A1 | 3/2014 | Passarelli |
| 2014/0069821 A1 | 3/2014 | Marcin et al. |
| 2014/0116956 A1 | 5/2014 | Yuan et al. |
| 2014/0197029 A1 | 7/2014 | Sparrow et al. |
| 2014/0246368 A1 | 9/2014 | Neubrand et al. |
| 2014/0263055 A1 | 9/2014 | Govindan et al. |
| 2014/0263081 A1 | 9/2014 | Thiers |
| 2014/0299462 A1 | 10/2014 | Thiers |
| 2014/0339162 A1 | 11/2014 | Cao et al. |
| 2014/0367871 A1 | 12/2014 | Govindan et al. |
| 2015/0013987 A1 | 1/2015 | Underwood et al. |
| 2015/0014248 A1 | 1/2015 | Herron et al. |
| 2015/0053619 A1 | 2/2015 | Cao et al. |
| 2015/0060360 A1 | 3/2015 | Motherway et al. |
| 2015/0083577 A1 | 3/2015 | Govindan et al. |
| 2015/0083656 A1 | 3/2015 | Williams |
| 2015/0107840 A1 | 4/2015 | Ligtherm et al. |
| 2015/0107841 A1 | 4/2015 | Suijkerbuijk et al. |
| 2015/0129410 A1 | 5/2015 | Govindan et al. |
| 2016/0040522 A1 | 2/2016 | Jacob et al. |
| 2016/0137526 A1 | 5/2016 | Govindan et al. |
| 2016/0228795 A1 | 8/2016 | St. John et al. |
| 2016/0229705 A1 | 8/2016 | St. John et al. |
| 2016/0244349 A1 | 8/2016 | St. John et al. |
| 2016/0339354 A1 | 11/2016 | Govindan et al. |
| 2016/0339356 A1 | 11/2016 | Govindan et al. |

(56) References Cited

U.S. PATENT DOCUMENTS

| | | |
|---|---|---|
| 2016/0339357 A1 | 11/2016 | Govindan et al. |
| 2017/0036171 A1 | 2/2017 | Lienhard et al. |
| 2017/0044033 A1 | 2/2017 | Lienhard et al. |
| 2017/0144906 A1 | 5/2017 | Andrews et al. |
| 2017/0174543 A1 | 6/2017 | Govindan et al. |

FOREIGN PATENT DOCUMENTS

| | | |
|---|---|---|
| CA | 2821453 | 1/2014 |
| CA | 2816746 | 4/2014 |
| CA | 2821458 | 7/2014 |
| CN | 1623936 A | 6/2005 |
| CN | 1856447 A | 11/2006 |
| CN | 100999364 A | 7/2007 |
| CN | 101056693 A | 10/2007 |
| CN | 101397152 A | 4/2009 |
| CN | 101636354 A | 1/2010 |
| CN | 101717161 A | 6/2010 |
| CN | 102143786 A | 8/2011 |
| CN | 102438957 A | 5/2012 |
| CN | 102725236 A | 10/2012 |
| CN | 102933507 A | 2/2013 |
| DE | 2145861 A1 | 11/1972 |
| EP | 0 207 390 | 1/1987 |
| EP | 0 253 287 A1 | 1/1988 |
| EP | 0 623 561 | 11/1994 |
| EP | 0 623 561 A1 | 11/1994 |
| EP | 1 775 267 A2 | 4/2007 |
| FR | 1582201 A | 9/1969 |
| FR | 2561637 A1 | 9/1985 |
| GB | 821 939 A | 10/1959 |
| GB | 1 013 767 A | 12/1965 |
| GB | 1 036 920 A | 7/1966 |
| GB | 1 444 241 A | 7/1976 |
| GB | 2 395 946 A | 6/2004 |
| JP | S55-147199 A | 11/1980 |
| KR | 101229482 B1 | 2/2013 |
| WO | WO 95/27683 | 10/1995 |
| WO | WO 00/00273 A1 | 1/2000 |
| WO | WO 01/14256 A1 | 3/2001 |
| WO | WO 02/32813 A1 | 4/2002 |
| WO | WO 2005/012185 A1 | 2/2005 |
| WO | WO 2007/128062 | 11/2007 |
| WO | WO 2007/132477 A1 | 11/2007 |
| WO | WO 2007/138327 A1 | 12/2007 |
| WO | WO 2007/144591 A1 | 12/2007 |
| WO | WO 2010/026589 A1 | 3/2010 |
| WO | WO 2010/118425 A1 | 10/2010 |
| WO | WO 2010/122336 A2 | 10/2010 |
| WO | WO 2010/131251 A2 | 11/2010 |
| WO | WO 2010/135561 A2 | 11/2010 |
| WO | WO 2011/159743 A1 | 12/2011 |
| WO | WO 2012/138502 A1 | 10/2012 |
| WO | WO 2012/159203 | 11/2012 |
| WO | WO 2013/012548 A1 | 1/2013 |
| WO | WO 2013/037047 | 3/2013 |
| WO | WO 2013/078124 A1 | 5/2013 |
| WO | WO 2013/158315 A1 | 10/2013 |
| WO | WO 2013/159220 | 10/2013 |
| WO | WO 2014/058696 A1 | 4/2014 |
| WO | WO 2014/088826 A1 | 6/2014 |
| WO | WO 2014/121153 A2 | 8/2014 |
| WO | WO 2014/144778 A1 | 9/2014 |
| WO | WO 2014/150848 A1 | 9/2014 |
| WO | WO 2014/162094 A2 | 10/2014 |
| WO | WO 2014/188450 A1 | 11/2014 |
| WO | WO 2014/200829 | 12/2014 |
| WO | WO 2015/021062 A1 | 2/2015 |
| WO | WO 2015/038983 A2 | 3/2015 |
| WO | WO 2015/042584 A1 | 3/2015 |
| WO | WO 2015/061194 A1 | 4/2015 |
| WO | WO 2017/030932 A1 | 2/2017 |
| WO | WO 2017/030937 A1 | 2/2017 |
| WO | WO 2017/030941 A1 | 2/2017 |
| WO | WO 2017/044645 A1 | 3/2017 |
| WO | WO 2017/044668 A1 | 3/2017 |
| WO | WO 2017/127607 A1 | 7/2017 |

OTHER PUBLICATIONS

Moghadasi et al., Scale deposits in porous media and their removal by EDTA injection. ECI Symposium Series. 2007. vol. RP5. Article 10. p. 57-70.

International Preliminary Report on Patentability for PCT/US2014/049812, mailed Jul. 30, 2015.

International Search Report and Written Opinion dated Jan. 12, 2015 for PCT/US2014/049812.

International Search Report and Written Opinion mailed May 23, 2014 for Application No. PCT/US2014/024384.

Al-Hallaj et al., Solar desalination with a humidification-dehumidification cycle: performance of the unit. Desalination. 1998;120:273-80.

El-Dessouky et al., Multiple-effect evaporation desalination systems: thermal analysis. Desalination. 1999;125:259-76.

Global Water Intelligence, Water Desalination Report. Tom Pankratz, ed. Dec. 17, 2012;48(48):1-4.

Klausner et al., Evaporative heat and mass transfer for the diffusion driven desalination process. Heat Mass Transfer. 2006;42:528-36.

Li, Mineral precipitation and deposition in cooling systems using impaired waters: mechanisms, kinetics, and inhibition. Dissertation defended Jul. 27, 2010. 224 pages.

Narayan et al., The potential of solar-driven humidification-dehumidification desalination for small-scale decentralized water production. Renewable and Sustainable Energy Reviews. 2010;14:1187-1201.

Narayan et al., Thermal design of the humidification desalination system: an experimental investigation. International Journal of Heat and Mass Transfer. 2013;58:1-9.

Narayan et al., Thermodynamic balancing of the humidification dehumidification desalination system by mass extraction and injection. International Journal of Heat and Mass Transfer. 2013;57:756-70.

SINEX, EDTA—A molecule with a complex story. University of Bristol, School of Chemistry. <www.chm.bris.ac.uk/motm/edta/edtah.htm> (accessed Jan. 8, 2013). Aug. 1, 2007.

Zamen et al., Improvement of solar humidification-dehumidification desalination using multi-stage process. 6 pages. Accessed Jun. 6, 2014.

Office Communication for U.S. Appl. No. 14/946,524 mailed Apr. 15, 2016.

Office Communication for U.S. Appl. No. 14/719,295 mailed Oct. 4, 2016.

[No Author Listed], Accepta 4360 Material Safety Data Sheet. Accepta Ltd. Manchester, UK. Jul. 19, 2011. 5 pages.

[No Author Listed], Caustic Soda 50% Material Safety Data Sheet. Univar. Redmond, Washington. Apr. 8, 2013. 10 pages.

[No Author Listed], Color Removal Using Ozone. Spartan Environmental Technologies Air and Water Treatment—Technical Bulletin. Available Jul. 21, 2006. Last accessed Mar. 2, 2017 from <http://www.spartanwatertreatment.com/ozone-color-removal.html>.

[No Author Listed], Everything you want to know about Coagulation & Flocculation. Chapter 1: The Electrokinetic Connection. Zeta-Meter, Inc. Staunton, VA. 4th Edition. 1993:1-8.

[No Author Listed], Hi-Cal Hydrate Material Safety Data Sheet. Chemical Lime Co. Fort Worth, Texas. May 1, 2008. 6 pages.

[No Author Listed], Polyaluminum Chloride Solution Material Safety Data Sheet. GEO Specialty Chemicals, Ltd. Little Rock, Arkansas. Mar. 12, 2015. 11 pages.

[No Author Listed], Servco 1010 Material Safety Data Sheet. Servco Chemicals. Lubbock, Texas. Aug. 7, 2013. 4 pages.

[No Author Listed], Soda Ash Material Safety Data Sheet. Univar. Redmond, Washington. Apr. 7, 2003. 10 pages.

Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>.

(56) References Cited

OTHER PUBLICATIONS

Aramco, Saudi Aramco's 'Smart Water' May Aid Oil Production. Rigzone. Jul. 29, 2009. <http://www.rigzone.com/news/article_pf.asp?a_id=78707> Last accessed Jul. 30, 2015.
Arthur et al., Technical Summary of Oil & Gas Produced Water Treatement Technologies. All Consulting, LLC (Mar. 2005). Last accessed on Dec. 21, 2016 from <http://dvikan.no/ntnu-studentserver/reports/ALLConsulting-WaterTreatmentOptionsReport.pdf>. 53 pages.
Huang et al., The bridging force between colloidal particles in a polyelectrolyte solution. Langmuir. Nov. 27, 2012;28(47):16300-5. doi: 10.1021/la303918p.
Khayet et al., Determination of surface and bulk pore sizes of flat-sheet and hollow-fiber membranes by atomic force microscopy, gas permeation and solute transport methods. Desalination. 2003;158:57-64.
Kwak et al., New Insights on the Role of Multivalent Ions I Water-Carbonate Rock Interactions. Saudi Journal of Technology. 2014. Last accessed on Dec. 8, 2016 at <http://www.saudiaramco.com/content/dam/Publications/Journal-of-Technology/Summer2014/New_Insights.pdf>.
McGinnis et al., Pilot demonstration of the NH3/CO2 forward osmosis desalination process on high salinity brines. Desalination. Mar. 2013;312:67-74. Supporting information included.
Sahin, A Mathematical Model for Explanation of Ion Exchange of the Boric Acid Adsorption. Jour. Chem. Soc. Pak. 1998;20(1):12-8.
Office Action dated May 19, 2017 for CN App. No. 201480054728.0.
Office Action dated May 19, 2017 for U.S. Appl. No. 14/494,101.
Office Action dated Aug. 16, 2017 for SA App. No. 009/M/003497 and claims pending.
Office Action dated Feb. 27, 2017 for CN App. No. 201480052403.9 and claims pending.
Office Action dated Sep. 6, 2017 for CN App. No. 201480052403.9 and claims pending.
Office action dated Sep. 28, 2017 for U.S. Appl. No. 14/494,101 and claims pending.
International Search Report and Written Opinion dated Jan. 26, 2015 for PCT App. No. PCT/US2014/056997.
International Preliminary Report on Patentability (Chapter II) dated Jan. 11, 2016 for PCT App. No. PCT/US2014/056997.
Office action dated Oct. 11, 2017 for U.S. Appl. No. 14/943,467 and claims pending.
Govindan, Thermal Design of Humidification Dehumidification Systems for Affordable and Small-scale Desalination. Doctoral Thesis. Massachusetts Institute of Technology. Sep. 2012 286 pages.
Office Action dated Jan. 5, 2018 for AU App. No. 2014306078 and claims pending.
Office Action dated Nov. 19, 2017 for SA App. No. 009/M/003497 and claims pending.
Office Action dated Mar. 1, 2018 for CN App. No. 201480052403.9 and claims pending.
Office Action dated Feb. 26, 2018 for US Appl. No. 14/494,101 and claims pending.

* cited by examiner

WATER TREATMENT SYSTEMS AND ASSOCIATED METHODS

RELATED APPLICATIONS

This application claims priority under 35 U.S.C. § 119(e) to U.S. Provisional Patent Application Ser. No. 61/862,188, filed Aug. 5, 2013, and entitled "Methods for the Treatment of Aqueous Compositions"; U.S. Provisional Patent Application Ser. No. 61/881,365, filed Sep. 23, 2013, and entitled "Desalination Systems and Associated Methods"; U.S. Provisional Patent Application Ser. No. 61/906,620, filed Nov. 20, 2013, and entitled "Water Treatment Systems and Associated Methods"; U.S. Provisional Patent Application Ser. No. 61/908,263, filed Nov. 25, 2013, and entitled "Water Treatment Systems and Associated Methods"; and U.S. Provisional Patent Application Ser. No. 61/988,034, filed May 2, 2014, and entitled "Desalination Systems and Associated Methods"; each of which is incorporated herein by reference in its entirety for all purposes.

TECHNICAL FIELD

Systems for the treatment of water, and associated methods, are generally described.

BACKGROUND

Desalination is a process by which some amount of salt and/or other minerals and one or more other components of a liquid solution are at least partially separated. For example, salt water can be desalinated to produce fresh water suitable for human consumption, irrigation, industrial use, and/or a variety of other uses. Most of the modern interest in desalination is focused on developing cost-effective ways of providing fresh water for human use.

The presence of suspended solids, oils, scale-forming ions, and other contaminants can complicate and impede the operation of desalination systems. Improved desalination systems and methods incorporating water treatment steps are desirable.

SUMMARY

Water treatment systems and associated methods are generally described. The subject matter of the present invention involves, in some cases, interrelated products, alternative solutions to a particular problem, and/or a plurality of different uses of one or more systems and/or articles.

According to certain embodiments, a water treatment system is provided. In some embodiments, the water treatment system comprises an ion-removal apparatus configured to remove at least a portion of at least one scale-forming ion from an input stream received by the ion-removal apparatus to produce an ion-diminished stream containing less of the scale-forming ion relative to the input stream received by the ion-removal apparatus, and a desalination apparatus fluidically connected to the ion-removal apparatus and configured to remove water from an aqueous stream received by the desalination apparatus to produce a concentrated saline stream enriched in a dissolved monovalent salt relative to the aqueous stream received by the desalination apparatus. In some such embodiments, the ion-removal apparatus is configured to remove at least about 99% of the scale-forming ion from the input stream received by the ion-removal apparatus, and/or the ion-removal apparatus is configured to produce an ion-diminished stream containing scale-forming ions in an amount of less than about 50 mg/L, and/or the desalination apparatus comprises a humidification dehumidification desalination apparatus, and/or the concentrated saline stream has a density of from about 9 pounds per gallon to about 11 pounds per gallon.

In some embodiments, the water treatment system comprises a pH reduction apparatus configured to receive an aqueous input stream comprising scale-forming ions and to reduce the pH of the aqueous input stream in order to inhibit the scale-forming ions from precipitating, and a humidification-dehumidification desalination apparatus fluidically connected to the pH reduction apparatus and configured to remove water from an aqueous stream received by the desalination apparatus to produce a concentrated saline stream enriched in a dissolved salt relative to the aqueous stream received by the desalination apparatus.

In certain embodiments, the water treatment system comprises a separator configured to receive an aqueous input stream comprising a suspended and/or emulsified immiscible phase and to remove at least a portion of the suspended and/or emulsified immiscible phase to produce an immiscible phase-diminished stream, and a humidification-dehumidification desalination apparatus fluidically connected to the separator and configured to remove water from an aqueous stream received by the desalination apparatus to produce a concentrated saline stream enriched in a dissolved salt relative to the aqueous stream received by the desalination apparatus.

The water treatment system comprises, according to some embodiments, a suspended solids removal apparatus configured to remove at least a portion of suspended solids from an input stream received by the suspended solids removal apparatus to produce a suspended-solids-diminished stream, and a humidification-dehumidification desalination apparatus fluidically connected to the suspended solids removal apparatus and configured to remove water from an aqueous stream received by the desalination apparatus to produce a concentrated saline stream enriched in a dissolved salt relative to the aqueous stream received by the desalination apparatus.

In certain embodiments, the water treatment system comprises a volatile organic material (VOM) removal apparatus configured to remove at least a portion of VOM from an input stream received by the VOM removal apparatus to produce a VOM-diminished stream, and a desalination apparatus fluidically connected to the VOM removal apparatus and configured to remove water from an aqueous stream received by the desalination apparatus to produce a concentrated saline stream enriched in a dissolved salt relative to the aqueous stream received by the desalination apparatus. In some such embodiments, the VOM removal apparatus does not include any sources of thermal energy, and/or the input stream received by the VOM removal apparatus comprises at least a portion of a water-containing stream produced by the desalination apparatus that contains a lower concentration of the dissolved salt than the stream received by the desalination apparatus, and/or the desalination apparatus comprises a humidificiation-dehumidification desalination apparatus.

In certain embodiments, the water treatment system comprises a desalination apparatus configured to remove water from an aqueous stream received by the desalination apparatus to produce a concentrated saline stream enriched in a dissolved monovalent salt relative to the aqueous stream received by the desalination apparatus; a separator fluidically connected to the desalination apparatus and configured to receive an aqueous input stream comprising a suspended and/or emulsified immiscible phase and to remove at least a portion of the suspended and/or emulsified immiscible phase to produce an immiscible phase-diminished stream; an ion-removal apparatus fluidically connected to the desalination apparatus and configured to remove at least a portion of at least one scale-forming ion from an input stream received by the ion-removal apparatus to produce an ion-diminished stream containing less of the scale-forming ion relative to the input stream received by the ion-removal apparatus; a suspended solids removal apparatus fluidically connected to the desalination apparatus and configured to remove at least a portion of suspended solids from an input stream received by the suspended solids removal apparatus to produce a suspended-solids-diminished stream; and a volatile organic material (VOM) removal apparatus fluidically connected to the desalination apparatus and configured to remove at least a portion of VOM from an input stream received by the VOM removal apparatus to produce a VOM-diminished stream.

In some embodiments, the water treatment system comprises a skimmer configured to receive an aqueous input stream comprising a suspended and/or emulsified immiscible phase and to remove at least a portion of the suspended and/or emulsified immiscible phase to produce an immiscible phase-diminished stream, an ion-removal apparatus configured to receive at least a portion of the immiscible phase-diminished stream, and to precipitate at least a portion of at least one scale-forming ion from the immiscible phase-diminished stream portion received by the ion-removal apparatus using a chemical reagent to produce an ion-diminished stream containing less of the scale-forming ion relative to the input stream received by the ion-removal apparatus, a filter configured to receive at least a portion of the immiscible phase-diminished stream and/or at least a portion of the ion-diminished stream, and to remove at least a portion of suspended solids from the immiscible phase-diminished stream portion and/or the ion-diminished stream portion received by the filter to produce a suspended-solids-diminished stream, a carbon bed configured to receive at least a portion of the suspended-solids-diminished stream, and to remove at least a portion of VOM from the suspended-solids-diminished stream portion received by the carbon bed to produce a VOM-diminished stream, and a desalination apparatus configured to receive at least a portion of the VOM-diminished stream, and to remove at least a portion of water from the VOM-diminished stream portion received by the desalination apparatus to produce a concentrated saline stream enriched in a dissolved monovalent salt relative to the VOM-diminished stream portion received by the desalination apparatus.

According to some embodiments, the water treatment system comprises a skimmer configured to receive an aqueous input stream comprising a suspended and/or emulsified immiscible phase and to remove at least a portion of the suspended and/or emulsified immiscible phase to produce an immiscible phase-diminished stream, an ion-removal apparatus configured to receive at least a portion of the immiscible phase-diminished stream, and to precipitate at least a portion of at least one scale-forming ion from the immiscible phase-diminished stream portion received by the ion-removal apparatus using a chemical reagent to produce an ion-diminished stream containing less of the scale-forming ion relative to the input stream received by the ion-removal apparatus, a filter configured to receive at least a portion of the immiscible phase-diminished stream and/or at least a portion of the ion-diminished stream, and to remove at least a portion of suspended solids from the immiscible phase-diminished stream portion and/or the ion-diminished stream portion received by the filter to produce a suspended-solids-diminished stream, a desalination apparatus configured to receive at least a portion of the suspended-solids-diminished stream, and to remove at least a portion of water from the suspended-solids-diminished stream portion received by the desalination apparatus to produce a concentrated saline stream enriched in a dissolved monovalent salt relative to the suspended-solids-diminished stream portion received by the desalination apparatus and a water-containing stream containing less of the dissolved monovalent salt than the suspended-solids-diminished stream, and a carbon bed configured to receive at least a portion of the water-containing stream produced by the desalination apparatus, and to remove at least a portion of VOM from the water-containing stream portion received by the carbon bed to produce a VOM-diminished stream.

The water treatment system comprises, according to some embodiments, a skimmer configured to receive an aqueous input stream comprising a suspended and/or emulsified immiscible phase and to remove at least a portion of the suspended and/or emulsified immiscible phase to produce an immiscible phase-diminished stream, an electrocoagulation apparatus configured to receive at least a portion of the immiscible phase-diminished stream, and to remove at least a portion of at least one scale-forming ion from the immiscible phase-diminished stream portion received by the electrocoagulation apparatus to produce an ion-diminished stream containing less of the scale-forming ion relative to the input stream received by the electrocoagulation apparatus, a filter configured to receive at least a portion of the immiscible phase-diminished stream and/or at least a portion of the ion-diminished stream, and to remove at least a portion of suspended solids from the immiscible phase-diminished stream portion and/or the ion-diminished stream portion received by the filter to produce a suspended-solids-diminished stream, a carbon bed configured to receive at least a portion of the suspended-solids-diminished stream, and to remove at least a portion of VOM from the suspended-solids-diminished stream portion received by the carbon bed to produce a VOM-diminished stream, and a desalination apparatus configured to receive at least a portion of the VOM-diminished stream, and to remove at least a portion of water from the VOM-diminished stream portion received by the desalination apparatus to produce a concentrated saline stream enriched in a dissolved monovalent salt relative to the VOM-diminished stream portion received by the desalination apparatus.

In some embodiments, the water treatment system comprises a skimmer configured to receive an aqueous input stream comprising a suspended and/or emulsified immiscible phase and to remove at least a portion of the suspended and/or emulsified immiscible phase to produce an immiscible phase-diminished stream, an electrocoagulation apparatus configured to receive at least a portion of the immiscible phase-diminished stream, and to remove at least a portion of at least one scale-forming ion from the immiscible phase-diminished stream portion received by the electrocoagulation apparatus to produce an ion-diminished stream containing less of the scale-forming ion relative to the input stream received by the electrocoagulation apparatus, a filter configured to receive at least a portion of the immiscible phase-diminished stream and/or at least a portion of the ion-diminished stream, and to remove at least a portion of suspended solids from the immiscible phase-diminished stream portion and/or the ion-diminished stream portion received by the filter to produce a suspended-solids-diminished stream, a desalination apparatus configured to receive at least a portion of the suspended-solids-diminished stream, and to remove at least a portion of water from the suspended-solids-diminished stream portion received by the desalination apparatus to produce a concentrated saline stream enriched in a dissolved monovalent salt relative to the suspended-solids-diminished stream portion received by the desalination apparatus and a water-containing stream containing less of the dissolved monovalent salt than the suspended-solids-diminished stream, and a carbon bed configured to receive at least a portion of the water-containing stream produced by the desalination apparatus, and to remove at least a portion of VOM from the water-containing stream portion received by the carbon bed to produce a VOM-diminished stream.

In some embodiments, the water treatment system comprises a skimmer configured to receive an aqueous input stream comprising a suspended and/or emulsified immiscible phase and to remove at least a portion of the suspended and/or emulsified immiscible phase to produce an immiscible phase-diminished stream, a filter configured to receive at least a portion of the immiscible phase-diminished stream, and to remove at least a portion of suspended solids from the immiscible phase-diminished stream portion received by the filter to produce a suspended-solids-diminished stream, a carbon bed configured to receive at least a portion of the suspended-solids-diminished stream, and to remove at least a portion of VOM from the suspended-solids-diminished stream portion received by the carbon bed to produce a VOM-diminished stream, a resin bed configured to receive at least a portion of the VOM-diminished stream, and to remove at least a portion of at least one scale-forming ion from the VOM-diminished stream portion received by the resin bed to produce an ion-diminished stream containing less of the scale-forming ion relative to the input stream received by the resin bed, and a desalination apparatus configured to receive at least a portion of the ion-diminished stream, and to remove at least a portion of water from the ion-diminished stream portion received by the desalination apparatus to produce a concentrated saline stream enriched in a dissolved monovalent salt relative to the ion-diminished stream portion received by the desalination apparatus.

The water treatment system comprises, according to certain embodiments, a skimmer configured to receive an aqueous input stream comprising a suspended and/or emulsified immiscible phase and to remove at least a portion of the suspended and/or emulsified immiscible phase to produce an immiscible phase-diminished stream, a filter configured to receive at least a portion of the immiscible phase-diminished stream, and to remove at least a portion of suspended solids from the immiscible phase-diminished stream portion received by the filter to produce a suspended-solids-diminished stream, a resin bed configured to receive at least a portion of the suspended-solids-diminished stream, and to remove at least a portion of at least one scale-forming ion from the suspended-solids-diminished stream portion received by the resin bed to produce an ion-diminished stream containing less of the scale-forming ion relative to the input stream received by the resin bed, a desalination apparatus configured to receive at least a portion of the ion-diminished stream, and to remove at least a portion of water from the ion-diminished stream portion received by the desalination apparatus to produce a concentrated saline stream enriched in a dissolved monovalent salt relative to the ion-diminished stream portion received by the desalination apparatus and a water-containing stream containing less of the dissolved monovalent salt than the ion-diminished stream, and a carbon bed configured to receive at least a portion of the water-containing stream produced by the desalination apparatus, and to remove at least a portion of VOM from the water-containing stream portion received by the carbon bed to produce a VOM-diminished stream.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Water treatment systems and associated methods are generally described. Certain embodiments of the water treatment systems and methods described herein can be used to pre-treat an aqueous stream that is subsequently transported to a desalination apparatus and/or post-treat an aqueous stream that has been produced by a desalination apparatus. In some embodiments, the water treatment system comprises a separator configured to remove at least a portion of a suspended and/or emulsified immiscible phase from an aqueous input stream to produce an immiscible phase-diminished stream. For example, the separator may be used to remove oil, grease, and/or other immiscible phases before the aqueous stream is transported to downstream unit operations. In certain embodiments, the water treatment system comprises a suspended solids removal apparatus configured to remove at least a portion of suspended solids from an aqueous stream. In some embodiments, the water treatment system comprises an ion-removal apparatus configured to remove at least a portion of at least one scale-forming ion from an aqueous stream. The water treatment system comprises, in some embodiments, a volatile organic material (VOM) removal apparatus configured to remove at least a portion of VOM from an aqueous stream. According to some embodiments, the water treatment system comprises a pH reduction apparatus, which can be configured to reduce the pH of an aqueous input stream in order to inhibit scale-forming ions from precipitating.

Certain of the water treatment systems described herein comprise a desalination apparatus configured to remove water from an aqueous stream to produce a concentrated saline stream enriched in a dissolved salt relative to the aqueous stream received by the desalination apparatus. The desalination apparatus can be configured, according to some embodiments, to produce a water-containing stream that contains a lower concentration of the dissolved salt (e.g., dissolved monovalent salt) than the stream fed to the desalination apparatus.

Figure 1:
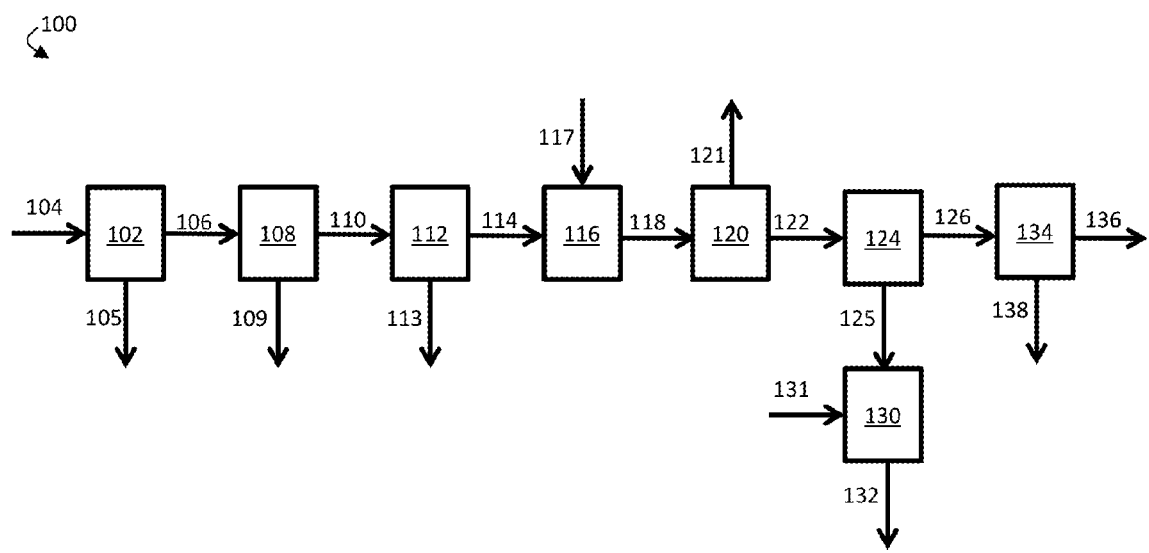
FIG. 1 is a schematic illustration of an exemplary water treatment system, according to certain embodiments.

FIG. 1 is a schematic diagram of an exemplary water treatment system 100, according to certain embodiments. The water treatment system shown in FIG. 1 includes a number of components that can be used to treat an aqueous stream containing at least one dissolved salt. Various of these components are described in detail below.

In some embodiments, the water treatment system comprises an optional separator configured to receive an aqueous input stream comprising a suspended and/or emulsified immiscible phase. The separator can be configured to remove at least a portion of the suspended and/or emulsified immiscible phase from an input stream received by the separator to produce an immiscible-phase-diminished stream. Generally, the immiscible-phase-diminished stream contains less of the suspended and/or emulsified immiscible phase than is present in the stream fed to the separator. According to certain embodiments, the two fluids are immiscible such that one is not soluble in the other to a level of more than 10% by weight at the temperature and under the conditions at which the emulsion is processed in the separator.

Referring to FIG. 1, water treatment system 100 comprises optional separator 102 configured to receive aqueous input stream 104 comprising a suspended and/or emulsified immiscible phase. Optional separator 102 can be configured to remove at least a portion of the suspended and/or emulsified immiscible phase to produce immiscible phase diminished stream 106, which contains less of the suspended and/or emulsified immiscible phase than stream 104. The separator can also produce a stream that is enriched in the suspended and/or emulsified immiscible phase relative to the stream fed to the separator. For example, in FIG. 1, separator 102 can be configured to produce stream 105, which is enriched in the suspended and/or emulsified water-immiscible phase relative to stream 104.

The separator can be configured to remove a variety of suspended and/or emulsified water-immiscible materials (e.g., liquid-phase water-immiscible materials) from the aqueous stream input to the separator. In some embodiments, the immiscible phase comprises oil and/or grease. It should be noted that the term "oil" merely refers to a fluid that is generally more hydrophobic than water and is not miscible or soluble in water, as is known in the art. Thus, the oil may be a hydrocarbon in some embodiments, but in other embodiments, the oil may comprise other hydrophobic fluids.

In certain embodiments, the separator is configured to remove a relatively large percentage of the water-immiscible materials from the stream fed to the separator. For example, in some embodiments, the amount (in weight percentage, wt %) of at least one water-immiscible material within the stream exiting the separator (e.g., stream 106 in FIG. 1) is at least about 50%, at least about 75%, at least about 90%, at least about 95%, or at least about 99% less than the amount of the at least one water-immiscible material within the stream entering the separator (e.g., stream 104 in FIG. 1). To illustrate, if the stream exiting the separator contains 5 wt % water-immiscible material, and the stream entering the separator contains 50 wt % water-immiscible material, then the stream exiting the separator contains 90% less water-immiscible than the stream entering the separator. In certain embodiments, the sum of the amounts of all water-immiscible materials within the stream exiting the separator is at least about 50%, at least about 75%, at least about 90%, at least about 95%, or at least about 99% less than the sum of the amounts of all water-immiscible materials within the stream entering the separator.

The separator may be fluidically connected to one or more other unit operations of the water treatment system, either directly or indirectly. In certain embodiments, the separator is fluidically connected to a desalination apparatus, described in more detail below. Referring to FIG. 1, for example, separator 102 is fluidically connected to desalination apparatus 124, described in more detail below, via streams 106, 110, 114, 118, and 122. The separator may also be, in certain embodiments, fluidically connected to an optional suspended solids removal apparatus. For example, in FIG. 1, separator 102 is fluidically connected to optional suspended solids removal apparatus 108, described in more detail below, via stream 106. In some embodiments, the separator may be fluidically connected to an optional ion-removal apparatus. For example, in FIG. 1, separator 102 is fluidically connected to optional ion-removal apparatus 112, described in more detail below, via streams 106 and 110. In certain embodiments, the separator may be fluidically connected to an optional pH reduction apparatus. For example, in FIG. 1, separator 102 is fluidically connected to optional pH reduction apparatus 116, described in more detail below, via streams 106, 110, and 114. The separator may be, in some embodiments, fluidically connected to an optional VOM removal apparatus. For example, in FIG. 1, separator 102 is fluidically connected to optional VOM removal apparatus 120, described in more detail below, via streams 106, 110, 114, and 118.

In some embodiments, the separator is directly fluidically connected to a suspended solids removal apparatus. For example, in FIG. 1, separator 102 is directly fluidically connected to suspended solids removal apparatus 108, described in more detail below, via stream 106. In certain embodiments, the separator can be configured to remove suspended solids. In some such embodiments, the separator can be configured to perform any of the functions described herein with respect to the suspended solids removal apparatus. For example, in some such embodiments, the separator can be configured to remove dirt, precipitated salts, organic solids, and/or any other suspended solid material. In some embodiments, the separator can be configured to remove at least about 50%, at least about 75%, at least about 90%, at least about 95%, or at least about 99% of the suspended solids within the stream that is transported to the separator.

It should be understood that the invention is not limited to embodiments in which the separator is directly fluidically connected to a suspended solids removal apparatus, and in some embodiments, the separator can be directly fluidically connected to one or more other unit operations. In some embodiments, the separator is directly fluidically connected to an ion-removal apparatus, described in more detail below. In certain embodiments, the separator is directly fluidically connected to a pH reduction apparatus, described in more detail below. According to some embodiments, the separator is directly fluidically connected to a VOM removal apparatus, described in more detail below. In some embodiments, the separator is directly fluidically connected to a desalination apparatus, described in more detail below.

A variety of types of separators may be used in the embodiments described herein. In some embodiments, the separator at least partially separates the immiscible phase from the aqueous stream via gravity, centrifugal force, adsorption, and/or using a barrier.

In some embodiments, the separator comprises a hydrocyclone, such as a de-oiling hydrocyclone. In some embodiments, the hydrocyclone can be configured to remove droplets of the immiscible phase having a diameter of greater than about 10 micrometers.

In certain embodiments, the separator comprises a corrugated plate interceptor. In some embodiments, the corrugated plate interceptor can be configured to remove droplets of the immiscible phase having a diameter of greater than about 50 micrometers.

In some embodiments, the separator comprises an adsorption media filter. The adsorption media filter can contain an adsorption medium. The adsorption medium may comprise, for example, walnut shells. In some embodiments, the adsorption media filter can be configured to remove droplets of the immiscible phase having a diameter of greater than about 150 micrometers.

The separator comprises, according to certain embodiments, a coalescing media filter. The coalescing media filter can be configured, in some embodiments, to remove droplets of the immiscible phase having a diameter of less than about 2 micrometers.

In some embodiments, the separator comprises a membrane filter. In certain embodiments, the membrane filter can be configured to remove droplets of the immiscible phase having a diameter of less than about 1 micrometer.

In certain embodiments, the separator comprises a settling zone in which water and the immiscible phase are at least partially physically separated. The settling zone may comprise, for example, a crystallization tank (which can be, in some embodiments, a settling tank). As one example, the separator may comprise, according to certain embodiments, an American Petroleum Institute separator, commonly referred to as API separators. In some embodiments, the API separator can be configured to remove droplets of the immiscible phase having a diameter of greater than about 150 micrometers.

According to some embodiments, the separator comprises a skimmer. In some embodiments, the separator comprises a dissolved gas floatation (DGF) apparatus. In certain embodiments, the separator comprises an induced gas flotation (IGF) apparatus. In some embodiments, the DGF and/or IGF apparatus can be configured to remove droplets of the immiscible phase having a diameter of greater than about 20 micrometers.

In some embodiments, the water treatment systems described herein can comprise an optional suspended solids removal apparatus. The suspended solids removal apparatus can be configured, according to certain embodiments, to remove at least a portion of suspended solids from an input stream received by the suspended solids removal apparatus to produce a suspended-solids-diminished stream. Generally, the suspended solids diminished stream contains a smaller quantity of suspended solids than the input stream received by the suspended solids removal apparatus. In FIG. 1, for example, suspended solids removal apparatus 108 can be configured to remove at least a portion of suspended solids from input stream 106 to produce a suspended solids diminished stream 110. The suspended solids removal apparatus can also produce a stream that is enriched in the suspended solids relative to the stream fed to the suspended solids removal apparatus. For example, in FIG. 1, suspended solids removal apparatus 108 can be configured to produce stream 109, which is enriched in the suspended solids relative to stream 106.

The suspended solids removal apparatus can be configured to remove any suspended solids that may be present in the stream fed to the suspended solids removal apparatus. According to certain embodiments, the suspended solids removal apparatus can be configured to remove particles that remain in suspension in water as a colloid or due to the motion of the water. In some embodiments, the suspended solids removal apparatus can be configured to remove dirt, precipitated salts, organic solids (e.g., pathogens such as bacteria, Giardia, and the like), and/or any other solid material. In some embodiments, the suspended solids that are removed by the suspended solids removal apparatus comprise particulate solids.

In certain embodiments, the suspended solids removal apparatus is configured to remove a relatively large percentage of the suspended solids from the stream fed to the suspended solids removal apparatus. For example, in some embodiments, the amount (in weight percentage, wt %) of at least one suspended solid material within the stream exiting the suspended solids removal apparatus (e.g., stream 110 in FIG. 1) is at least about 50%, at least about 75%, at least about 90%, at least about 95%, or at least about 99% less than the amount of the at least one suspended solid material within the stream entering the suspended solids removal apparatus (e.g., stream 106 in FIG. 1). In certain embodiments, the sum of the amounts of all suspended solid materials within the stream exiting the suspended solids removal apparatus is at least about 50%, at least about 75%, at least about 90%, at least about 95%, or at least about 99% less than the sum of the amounts of all suspended solid materials within the stream entering the suspended solids removal apparatus.

The suspended solids removal apparatus may be fluidically connected to one or more other unit operations of the water treatment system, either directly or indirectly. In certain embodiments, the suspended solids removal apparatus is fluidically connected to a desalination apparatus, described in more detail below. Referring to FIG. 1, for example, suspended solids removal apparatus 108 is fluidically connected to desalination apparatus 124, described in more detail below, via streams 110, 114, 118, and 122. The suspended solids removal apparatus may also be, in certain embodiments, fluidically connected to an optional separator. For example, in FIG. 1, suspended solids removal apparatus 108 is fluidically connected to optional separator 102 via stream 106. In some embodiments, the suspended solids removal apparatus may be fluidically connected to an optional ion-removal apparatus. For example, in FIG. 1, suspended solids removal apparatus 108 is fluidically connected to optional ion-removal apparatus 112, described in more detail below, via stream 110. In certain embodiments, the suspended solids removal apparatus may be fluidically connected to an optional pH reduction apparatus. For example, in FIG. 1, suspended solids removal apparatus 108 is fluidically connected to optional pH reduction apparatus 116, described in more detail below, via streams 110 and 114. The suspended solids removal apparatus may be, in some embodiments, fluidically connected to an optional VOM removal apparatus. For example, in FIG. 1, suspended solids removal apparatus 108 is fluidically connected to optional VOM removal apparatus 120, described in more detail below, via streams 110, 114, and 118.

In some embodiments, the suspended solids removal apparatus is directly fluidically connected to a separator. For example, in FIG. 1, suspended solids removal apparatus 108 is directly fluidically connected to separator 102 via stream 106. In certain embodiments, the suspended solids removal apparatus is directly fluidically connected to an ion-removal apparatus. For example, in FIG. 1, suspended solids removal apparatus 108 is directly fluidically connected to ion-removal apparatus 112, described in more detail below, via stream 110. In some embodiments, the suspended solids removal apparatus can be directly fluidically connected to one or more other unit operations. In some embodiments, the suspended solids removal apparatus is directly fluidically connected to a pH reduction apparatus, described in more detail below. According to some embodiments, the suspended solids removal apparatus is directly fluidically connected to a VOM removal apparatus, described in more detail below. In some embodiments, the suspended solids removal apparatus is directly fluidically connected to a desalination apparatus, described in more detail below.

A variety of types of suspended solids removal apparatuses may be used in the embodiments described herein. In some embodiments, the suspended solids removal apparatus comprises a filter, a gravity settler, and/or a coagulant induced flocculator. In some embodiments, the coagulant induced flocculator contains a ferric chloride and/or an alum coagulant. The filter may comprise, for example, a bag filter and/or a media filter. The media filter may, according to some embodiments, comprise a diatomaceous earth medium.

According to certain embodiments, the water treatment system can comprise an optional ion-removal apparatus. The ion-removal apparatus can be configured to remove at least a portion of at least one scale forming ion from an input stream received by the ion-removal apparatus to produce an ion-diminished stream. Generally, the ion-diminished stream contains less of the scale-forming ion (e.g., a scale-forming cation and/or a scale-forming anion) relative to the input stream received by the ion-removal apparatus. The use of the ion-removal apparatus to remove scale-forming ions can reduce the level of scaling within unit operations downstream of the ion-removal apparatus.

For example, referring to FIG. 1, system 100 comprises ion-removal apparatus 112. Ion-removal apparatus 112 can be configured, according to certain embodiments, to remove at least a portion of at least one scale-forming ion from stream 110 received by ion-removal apparatus 112. Ion-removal apparatus 112 can be configured to produce ion-diminished stream 114, which contains less of the scale-forming ion relative to input stream 110 received by ion-removal apparatus 112. The ion-removal apparatus can also produce a stream that is enriched in the scale-forming ion relative to the stream fed to the ion-removal apparatus. For example, in FIG. 1, ion-removal apparatus 112 can be configured to produce stream 113, which is enriched in at least one scale-forming ion relative to stream 110.

In certain embodiments, the ion-removal apparatus removes at least a portion of at least one scale-forming ion while allowing a dissolved monovalent salt to remain dissolved in the aqueous stream transported out of the ion-removal apparatus.

The ion-removal apparatus can be configured to remove any scale-forming ion that is desired to be removed. Those of ordinary skill in the art are familiar with scale-forming ions, which are ions that tend to form solid scale when present in concentrations exceeding their solubility levels. Examples of scale forming ions include multivalent cations (e.g., $Mg^{2+}$, $Ca^{2+}$, $Sr^{2+}$, $Ba^{2+}$, and the like) and scale forming anions such as carbonate anions ($CO_3^{2-}$), bicarbonate anions ($HCO_3^-$), sulfate anions ($SO_4^{2-}$), bisulfate anions ($HSO_4^-$), dissolved silica (e.g., $SiO_2(OH)_2^{2-}$, $SiO(OH)^{3-}$, $(SiO_3^{2-})_n$, and the like), hydroxide ions ($OH^-$), and the like.

In some embodiments, the ion-removal apparatus is configured to remove at least one scale-forming cation. The scale-forming cation may be a multivalent cation, such as a bivalent cation, in some embodiments. For example, the ion-removal apparatus can be configured to remove, according to some embodiments, $Mg^{2+}$, $Ca^{2+}$, $Sr^{2+}$, and/or $Ba^{2+}$. Other scale-forming cations may also be removed using the ion-removal apparatus, according to certain embodiments. In some embodiments, the ion-removal apparatus is configured to remove at least one scale-forming anion. Non-limiting examples of scale-forming anions the ion-removal apparatus can be configured to remove include carbonate anions ($CO_3^{2-}$), bicarbonate anions ($HCO_3^-$), sulfate anions ($SO_4^{2-}$), bisulfate anions ($HSO_4^-$), and/or dissolved silica (e.g., $SiO_2(OH)_2^{2-}$, $SiO(OH)^{3-}$, $(SiO_3^{2-})_n$, and the like). In some embodiments, the ion-removal apparatus is configured to remove one or more multivalent scale-forming anions, such as one or more bivalent scale-forming anions (e.g., carbonate anions ($CO_3^{2-}$) and/or sulfate anions ($SO_4^{2-}$)).

In some instances, the scale-forming ions that are removed from the aqueous feed stream using the ion-removal apparatus may be sparingly soluble (e.g., having a solubility of less than about 1 gram per 100 grams of water, less than about 0.1 grams per 100 grams of water, or less than about 0.01 grams per 100 grams of water (or lower) at 20° C.). Therefore, according to some embodiments, such scale-forming ions may be prone to scaling within various parts of the water treatment system. Examples of sparingly soluble salts containing scale-forming ions include, but are not limited to, calcium carbonate ($CaCO_3$), which has a solubility of about 0.000775 grams per 100 grams of water at 20° C.; calcium sulfate ($CaSO_4$), which has a solubility of about 0.264 grams per 100 grams of water at 20° C.; magnesium hydroxide ($Mg(OH)_2$), which has a solubility of about 0.0009628 grams per 100 grams of water at 20° C.; and barium sulfate ($BaSO_4$), which has a solubility of about 0.000285 grams per 100 grams of water at 20° C. The ion-removal apparatus can be configured, according to certain embodiments, such that removal of the scale-forming ions inhibits or prevents scaling of solid salts comprising the scale-forming ions during operation of the water treatment system.

In certain embodiments, the ion-removal apparatus is configured to remove a relatively large percentage of the dissolved scale-forming ions from the feed stream. For example, in some embodiments, the concentration, in moles per liter (i.e., molarity), of at least one scale-forming ion within the stream exiting the ion-removal apparatus (e.g., stream 114 in FIG. 1) is at least about 50%, at least about 75%, at least about 90%, at least about 95%, or at least about 99% less than the concentration of the at least one scale-forming ion within the stream entering the ion-removal apparatus (e.g., stream 110 in FIG. 1). In certain embodiments, the sum of the concentrations, in moles per liter, of all scale-forming ions within the stream exiting the ion-removal apparatus is at least about 50%, at least about 75%, at least about 90%, at least about 95%, or at least about 99% less than the sum of the concentrations of all scale-forming ions within the stream entering the ion-removal apparatus.

According to certain embodiments, the ion-removal apparatus is configured to produce an ion-diminished stream containing scale-forming ions in an amount of less than about 50 mg/L, less than about 10 mg/L, less than about 1 mg/L, or less than about 0.1 mg/L. In some embodiments, the ion-diminished stream is substantially free of scale-forming ions.

The ion-removal apparatus may be fluidically connected to one or more other unit operations of the water treatment system, either directly or indirectly. In certain embodiments, the ion-removal apparatus is fluidically connected to a desalination apparatus, described in more detail below. Referring to FIG. 1, for example, ion-removal apparatus 112 is fluidically connected to desalination apparatus 124, described in more detail below, via streams 114, 118, and 122. The ion-removal apparatus may also be, in certain embodiments, fluidically connected to an optional separator. For example, in FIG. 1, ion-removal apparatus 112 is fluidically connected to optional separator 102 via streams 106 and 110. In some embodiments, the ion-removal apparatus may be fluidically connected to an optional suspended solids removal apparatus. For example, in FIG. 1, ion-removal apparatus 112 is fluidically connected to suspended solids removal apparatus 108 via stream 110. In certain embodiments, the ion-removal apparatus may be fluidically connected to an optional pH reduction apparatus. For example, in FIG. 1, ion-removal apparatus 112 is fluidically connected to optional pH reduction apparatus 116, described in more detail below, via stream 114. The ion-removal apparatus may be, in some embodiments, fluidically connected to an optional VOM removal apparatus. For example, in FIG. 1, ion-removal apparatus 112 is fluidically connected to optional VOM removal apparatus 120, described in more detail below, via streams 114 and 118.

In some embodiments, the ion-removal apparatus is directly fluidically connected to a suspended solids removal apparatus. For example, in FIG. 1, ion-removal apparatus 112 is directly fluidically connected to suspended solids removal apparatus 108 via stream 110. In certain embodiments, the ion-removal apparatus is directly fluidically connected to a pH reduction apparatus. For example, in FIG. 1, ion-removal apparatus 112 is directly fluidically connected to pH reduction apparatus 116, described in more detail below, via stream 114. In some embodiments, the ion-removal apparatus can be directly fluidically connected to one or more other unit operations. In some embodiments, the ion-removal apparatus is directly fluidically connected to a separator. In some embodiments, the ion-removal apparatus is directly fluidically connected to a VOM removal apparatus, described in more detail below. In some embodiments, the ion-removal apparatus is directly fluidically connected to a desalination apparatus, described in more detail below.

A variety of types of ion-removal apparatuses may be used in the embodiments described herein.

In some embodiments, the ion-removal apparatus comprises an ion-removal medium, which can be contained, for example, within a vessel.

In some embodiments, the ion-removal apparatus comprises a chemical ion-removal apparatus. In some embodiments, the chemical ion-removal apparatus comprises an ion-removal composition configured to induce precipitation of the at least one scale-forming ion. For example, the chemical ion-removal apparatus can be configured to remove at least one ion using caustic soda, soda ash, and/or an anionic polymer. In some embodiments, the ion-removal composition can be configured to induce precipitation of at least one scale-forming cation. For example, when caustic soda and/or soda ash are added to a stream containing $Ca^{2+}$ and/or $Mg^{2+}$, at least a portion of $Ca^{2+}$ and/or $Mg^{2+}$ contained within the stream may be precipitated as an insoluble solid such as, for example, calcium carbonate and/or magnesium hydroxide. In some embodiments, an anionic polymer may be used as the ion-removal medium. In some embodiments, the composition can be configured to induce precipitation of at least one scale-forming anion. For example, a cationic polymer can be used as an ion-removal medium to remove scale-forming anions. Mixtures of the above-mentioned ion-removal media and/or other ion-removal media may also be used.

In certain embodiments, the ion-removal apparatus comprises an electrocoagulation apparatus. The electrocoagulation apparatus can be configured, in some embodiments, to remove at least a portion of suspended solids from the aqueous stream rather than, or in addition to, removing at least a portion of at least one scale-forming ion from the aqueous stream. Those of ordinary skill in the art are familiar with electrocoagulation, in which short wave electrolysis can be used to remove at least a portion of multivalent ions and/or suspended contaminants.

In certain embodiments, the ion-removal apparatus comprises a resin bed. The resin bed contains, according to certain embodiments, an ion-exchange resin. The resin bed can comprise, for example, an anion selective resin bed and/or a cationic selective resin bed. In certain embodiments, the ion-removal apparatus is an ion-exchange apparatus. The ion-exchange apparatus may contain, for example, an ion-exchange medium. Those of ordinary skill in the art are familiar with the function of ion-exchange media, which generally remove at least one scale-forming ion from a solution and, in some but not all cases, replace the scale-forming ion(s) with one or more monovalent ion(s). For example, in certain embodiments, the ion-exchange medium functions by contacting the aqueous solution containing the scale-forming ion(s), after which at least a portion of the scale-forming ions are captured by the ion-exchange medium and at least a portion of the monovalent ions originally contained within the ion-exchange medium are released into the aqueous solution. In some such embodiments, the ion-exchange medium comprises an ion exchange resin.

Those of ordinary skill in the art would be capable of selecting an appropriate ion-removal medium (e.g., an ion-exchange medium or other ion-removal medium) for use in the ion-removal apparatus based upon the types of scale-forming ions dissolved in the stream fed to the ion-removal apparatus, the concentration of said ions, and the flow rate at which one desires to operate the ion-removal apparatus, among other factors. The ion-removal apparatus can include one or more tanks and/or columns in which the ion-removal operation is performed. For example, in certain embodiments, the ion-removal apparatus comprises one or more tanks into which the aqueous feed stream and the ion-removal medium are transported. In one set of embodiments, the aqueous feed stream and a precipitation-inducing ion-removal medium are fed to a series of tanks in which precipitation of scale-forming ions is allowed to occur. In other embodiments, a column (e.g., a packed column) can be used to perform the ion-removal operation. For example, in some embodiments, the aqueous solution can be fed to one or more packed columns containing an ion-exchange resin or other ion-removal medium, which may be used to remove at least a portion of the scale-forming ion(s) from the aqueous solution. One of ordinary skill in the art, given the present disclosure, would be capable of designing a variety of other suitable configurations for performing the ion-removal steps described herein.

In certain embodiments, the water treatment system can comprise a pH reduction apparatus configured to receive an aqueous input stream comprising scale forming ions and to reduce the pH of the aqueous input stream. In certain embodiments, reducing the pH of the aqueous input stream can be performed in order to inhibit scale forming ions from precipitating. For example, referring back to FIG. 1, system 100 includes optional pH reduction apparatus 116 which can be configured to receive aqueous input stream 114, which can comprise scale forming ions. pH reduction apparatus 116 can be configured to reduce the pH of aqueous input stream 114 in order to inhibit the scale forming ions from precipitating. This can result in the production of a pH reduced stream 118. In some embodiments, the pH-reduced stream has a pH of from about 6 to about 8, from about 6.5 to about 7.5, from about 6.8 to about 7.2, or from about 6.9 to about 7.1. In some embodiments, the pH-reduced stream has a pH of about 7. The pH of input stream 114 can be reduced, for example, by adding chemicals via stream 117, according to some embodiments. For example, an acidic composition can be added to the pH reduction apparatus to reduce the pH of stream 114, in certain embodiments.

The pH reduction apparatus may be fluidically connected to one or more other unit operations of the water treatment system, either directly or indirectly. In certain embodiments, the pH reduction apparatus is fluidically connected to a desalination apparatus, described in more detail below. Referring to FIG. 1, for example, pH reduction apparatus 116 is fluidically connected to desalination apparatus 124, described in more detail below, via streams 118 and 122. The pH reduction apparatus may also be, in certain embodiments, fluidically connected to an optional separator. For example, in FIG. 1, pH reduction apparatus 116 is fluidically connected to optional separator 102 via streams 106, 110, and 114. In some embodiments, the pH reduction apparatus may be fluidically connected to an optional suspended solids removal apparatus. For example, in FIG. 1, pH reduction apparatus 116 is fluidically connected to suspended solids removal apparatus 108 via stream 110 and 114. The pH reduction apparatus may be, in some embodiments, fluidically connected to an optional ion-removal apparatus. For example, in FIG. 1, pH reduction apparatus 116 is fluidically connected to optional ion-removal apparatus 112 via stream 114. In certain embodiments, the pH reduction apparatus may be fluidically connected to a VOM removal apparatus, described in more detail below. For example, in FIG. 1, pH reduction apparatus 116 is fluidically connected to optional VOM removal apparatus 120, described in more detail below, via stream 118.

In some embodiments, the pH reduction apparatus can be directly fluidically connected to an ion-removal apparatus. For example, in FIG. 1, pH reduction apparatus 116 is directly fluidically connected to ion-removal apparatus 112 via stream 114. In certain embodiments, the pH reduction apparatus is directly fluidically connected to VOM removal apparatus. For example, in FIG. 1, pH reduction apparatus 116 is directly fluidically connected to VOM removal apparatus 120, described in more detail below, via stream 118. In some embodiments, the pH reduction apparatus can be directly fluidically connected to one or more other unit operations. In some embodiments, the pH reduction apparatus is directly fluidically connected to a separator. In some embodiments, the pH reduction apparatus is directly fluidically connected to a suspended solids removal apparatus. In some embodiments, the pH reduction apparatus is directly fluidically connected to a desalination apparatus, described in more detail below.

In certain embodiments, the water treatment system comprises an optional volatile organic material (VOM) removal apparatus. The VOM removal apparatus can be configured to remove at least a portion of VOM from an input stream received by the VOM removal apparatus to produce a VOM-diminished stream. Generally, the VOM-diminished stream contains VOM in an amount that is less that the amount of VOM in the input stream received by the VOM removal apparatus.

The term "volatile organic material" or "VOM" is used herein to describe organic materials that at least partially evaporate at 25° C. and 1 atmosphere. In certain embodiments, the volatile organic material has a boiling point of less than or equal to 450° C. at 1 atmosphere. VOM includes volatile organic compounds (VOCs) and semi-volatile organic compounds (SVOCs). Examples of VOCs that can be at least partially removed by the VOM removal apparatus include, but are not limited to, acetone; 1,1,1,2-tetrachloroethane; 1,1,1-trichloroethane; 1,1,2,2-tetrachloroethane; 1,1,2-trichloroethane; 1,1-dichloroethane; 1,1-dichloroethene; 1,1-dichloropropene; 1,2,3-trichlorobenzene; 1,2,3-trichloropropane; 1,2,4-trichlorobenzene; 1,2,4-trimethylbenzene; 1,2-dibromo-3-chloropropane; 1,2-dibromoethane; 1,2-dichlorobenzene; 1,2-dichloroethane; 1,2-dichloropropane; 1,3,5-trimethylbenzene; 1,3-dichlorobenzene; 1,3-dichloropropane; 1,4-dichlorobenzene; 2,2-dichloropropane; 2-butanone; 2-chloroethyl vinyl ether; 2-chlorotoluene; 2-hexanone; 4-chlorotoluene; 4-methyl-2-pentanone; benzene; bromobenzene; bromochloromethane; bromodichloromethane; bromoform; carbon disulfide; carbon tetrachloride; chlorobenzene; chloroethane; chloroform; cis-1,2-dichloroethene; cis-1,3-dichloropropene; dibromochloromethane; dibromomethane; dichlorodifluoromethane; ethylbenzene; hexachlorobutadiene; isopropylbenzene; m-xylenes; p-xylenes; bromomethane; chloromethane; methylene chloride; n-butylbenzene; n-propylbenzene; naphthalene; o-xylene; p-Isopropyltoluene; sec-butylbenzene; styrene; tert-butylbenzene; tetrachloroethene; toluene; trans-1,2-dichloroethene; trans-1,3-dichloropropene; trichloroethene; trichlorofluoromethane; vinyl acetate; and vinyl chloride. Examples of SVOCs that can be at least partially removed by the VOM removal apparatus include, but are not limited to, 2,4,5-trichlorophenol; 2,4,6-trichlorophenol; 2,4-dichlorophenol; 2,4-dimethylphenol; 2,4-dinitrophenol; 2,4-dinitrotoluene; 2,6-dinitrotoluene; 2-chloronaphthalene; 2-chlorophenol; 2-methylnaphthalene; 2-methylphenol; 2-nitroaniline; 2-nitrophenol; 3,3'-dichlorobenzidine; 3-nitroaniline; 4,6-dinitro-2-methylphenol; 4-bromophenyl phenyl ether; 4-chloro-3-methylphenol; 4-chloroaniline; 4-chlorophenyl phenyl ether; 3 & 4-methylphenol; 4-nitroaniline; 4-nitrophenol; acenaphthene; acenaphthylene; anthracene; benzo(a)anthracene; benzo(a)pyrene; benzo(b)fluoranthene; benzo(g,h,i)perylene; benzo(k)fluoranthene; benzoic acid; benzyl alcohol; bis(2-chloroethoxy)methane; bis(2-chloroethyl)ether; bis(2-chloroisopropyl)ether; bis(2-ethylhexyl)phthalate; butyl benzyl phthalate; chrysene; di-n-butyl phthalate; di-n-octyl phthalate; dibenz(a,h)anthracene; dibenzofuran; diethyl phthalate; dimethyl phthalate; fluoranthene; fluorene; hexachlorobenzene; hexachlorocyclopentadiene; hexachloroethane; indeno(1,2,3-cd)pyrene; isophorone; n-nitroso-di-n-propylamine; n-nitrosodiphenylamine; nitrobenzene; pentachlorophenol; phenanthrene; phenol; and pyrene.

Referring back to FIG. 1, system 100 comprises optional VOM removal apparatus 120. VOM removal apparatus 120 can be configured to remove at least a portion of VOM from input stream 118 received by VOM removal apparatus 120 to produce a VOM-diminished stream 122, which contains less of the VOM relative to input stream 118 received by VOM removal apparatus 120. The VOM removal apparatus can also produce a stream that is enriched in VOM relative to the stream fed to the VOM removal apparatus. For example, in FIG. 1, VOM removal apparatus 120 can be configured to produce stream 121, which is enriched in VOM relative to stream 118.

In certain embodiments, the VOM removal apparatus is configured to remove a relatively large percentage of the VOM from the stream fed to the VOM removal apparatus. For example, in some embodiments, the amount (in weight percentage, wt %) of at least one VOM within the stream exiting the VOM removal apparatus (e.g., stream 122 in FIG. 1) is at least about 50%, at least about 75%, at least about 90%, at least about 95%, or at least about 99% less than the amount of the at least one VOM within the stream entering the VOM removal apparatus (e.g., stream 118 in FIG. 1). In certain embodiments, the sum of the amounts of all VOM within the stream exiting the VOM removal apparatus is at least about 50%, at least about 75%, at least about 90%, at least about 95%, or at least about 99% less than the sum of the amounts of all VOM within the stream entering the VOM removal apparatus.

In some embodiments, the VOM removal apparatus does not include any sources of thermal energy. For example, according to certain embodiments, the VOM removal apparatus does not include any steam input streams.

The VOM removal apparatus may be fluidically connected to one or more other unit operations of the water treatment system, either directly or indirectly. In certain embodiments, the VOM removal apparatus is fluidically connected to a desalination apparatus, described in more detail below. Referring to FIG. 1, for example, VOM removal apparatus 120 is fluidically connected to desalination apparatus 124, described in more detail below, via stream 122. The VOM removal apparatus may also be, in certain embodiments, fluidically connected to an optional separator. For example, in FIG. 1, VOM removal apparatus 120 is fluidically connected to optional separator 102 via streams 106, 110, 114, and 118. In some embodiments, the VOM removal apparatus may be fluidically connected to an optional suspended solids removal apparatus. For example, in FIG. 1, VOM removal apparatus 120 is fluidically connected to suspended solids removal apparatus 108 via stream 110, 114, and 118. The VOM removal apparatus may be, in some embodiments, fluidically connected to an optional ion-removal apparatus. For example, in FIG. 1, VOM removal apparatus 120 is fluidically connected to optional ion-removal apparatus 112 via streams 114 and 118. In certain embodiments, the VOM removal apparatus may be fluidically connected to an optional pH reduction apparatus. For example, in FIG. 1, VOM removal apparatus 120 is fluidically connected to optional pH reduction apparatus 116 via stream 118.

In some embodiments, the VOM removal apparatus can be directly fluidically connected to a pH reduction apparatus. For example, in FIG. 1, VOM removal apparatus 120 is directly fluidically connected to pH reduction apparatus 116 via stream 118. In certain embodiments, the VOM removal apparatus is directly fluidically connected to a desalination apparatus. For example, in FIG. 1, VOM removal apparatus 120 is directly fluidically connected to desalination apparatus 124, described in more detail below, via stream 122. In some embodiments, the VOM removal apparatus can be directly fluidically connected to one or more other unit operations. In some embodiments, the VOM removal apparatus is directly fluidically connected to a separator. In some embodiments, the VOM removal apparatus is directly fluidically connected to a suspended solids removal apparatus. In some embodiments, the VOM removal apparatus is directly fluidically connected to an ion-removal apparatus.

A variety of types of VOM removal apparatuses may be used in the embodiments described herein. In some embodiments, the VOM removal apparatus comprises a carbon bed filter and/or an air stripper. In some embodiments, the air stripper comprises a packed bed stripper, a low-profile air stripper, and/or an aeration stripper. In certain embodiments, the carbon bed comprises activated carbon.

According to some embodiments, the VOM removal apparatus is configured to remove at least a portion of VOM from at least partially desalinated water (e.g., from stream 125 in FIG. 1, described in more detail below). For example, in some embodiments, the input stream received by the VOM removal apparatus comprises at least a portion of a water-containing stream produced by the desalination apparatus that contains a lower concentration of the dissolved salt than the stream received by the desalination apparatus, as described in more detail below.

In some embodiments, the water treatment system comprises a desalination apparatus. The desalination apparatus can be configured to remove water from an aqueous stream received by the desalination apparatus to produce a concentrated saline stream enriched in a dissolved salt (e.g., enriched in a dissolved monovalent salt) relative to the aqueous stream received by the desalination apparatus. For example, in FIG. 1, system 100 comprises desalination apparatus 124, which is configured to remove water from aqueous stream 122 received by desalination apparatus 124 to produce a concentrated saline stream 126 enriched in a dissolved salt relative to aqueous stream 122 received by desalination apparatus 124.

The stream fed to the desalination apparatus contains, in certain embodiments, at least one dissolved monovalent salt. One advantage associated with certain (although not necessarily all) of the inventive systems and methods described herein is that they can be used to process streams with relatively high concentrations of dissolved monovalent salts. For example, in certain embodiments, the stream fed to the desalination apparatus may contain dissolved monovalent salts in an amount of at least about 2 wt %, at least about 5 wt %, at least about 10 wt %, at least about 20 wt %, or at least about 25 wt % (and/or, in certain embodiments, up to the solubility limit).

In certain embodiments, the desalination apparatus can be configured to remove water from an aqueous stream to produce a concentrated saline stream that is enriched in a dissolved monovalent salt relative to the aqueous stream received by the desalination apparatus. A dissolved salt is a salt that has been solubilized to such an extent that the component ions of the salt are no longer ionically bonded to each other. Generally, the term "monovalent salt" refers to a salt that includes a monovalent cation (i.e., a cation with a redox state of +1 when solubilized). Examples of monovalent salts include, but are not limited to, those containing sodium, potassium, lithium, rubidium, cesium, and francium. In certain embodiments, the monovalent salts include monovalent anions such as, for example, chlorine, bromine, fluorine, and iodine. Examples of monovalent salts include, but are not limited to, sodium chloride (NaCl), sodium bromide (NaBr), potassium chloride (KCl), potassium bromide (KBr), sodium carbonate ($Na_2CO_3$), sodium sulfate ($Na_2SO_4$), and the like. According to certain embodiments, the concentrated saline stream produced by the desalination apparatus includes dissolved salts such that the concentrated saline stream has a density of from about 9 pounds per gallon to about 11 pounds per gallon, from about 9.5 pounds per gallon to about 10.5 pounds per gallon, or from about 9.8 pounds per gallon to about 10.2 pounds per gallon. In some embodiments, the concentrated saline stream produced by the desalination apparatus includes dissolved salts such that it has a density of about 10 pounds per gallon.

In some embodiments, the desalination apparatus can also produce a water-containing stream that contains a lower concentration of the dissolved salt (e.g., dissolved monovalent salt) than the stream fed to the desalination apparatus. For example, in FIG. 1, desalination apparatus 124 can be configured to produce water-containing stream 125, which contains less of a dissolved salt (e.g., less of a dissolved monovalent salt) than stream 122 fed to desalination apparatus 124.

In some embodiments, the desalination apparatus is configured to produce a stream containing water of relatively high purity. For example, in some embodiments, the desalination apparatus produces a stream (e.g., stream 125 in FIG. 1) containing water in an amount of at least about 95 wt %, at least about 99 wt %, at least about 99.9 wt %, or at least about 99.99 wt % (and/or, in certain embodiments, up to about 99.999 wt %, or more).

The desalination apparatus may be fluidically connected to one or more other unit operations of the water treatment system, either directly or indirectly. In certain embodiments, the desalination apparatus is fluidically connected to an optional separator. For example, in FIG. 1, desalination apparatus 124 is fluidically connected to separator 102 via streams 106, 110, 114, 118, and 122. In certain embodiments, the desalination apparatus is fluidically connected to an optional suspended solids removal apparatus. For example, in FIG. 1, desalination apparatus 124 is fluidically connected to suspended solids removal apparatus 108 via streams 110, 114, 118, and 122. In certain embodiments, the desalination apparatus is fluidically connected to an optional ion-removal apparatus. For example, in FIG. 1, desalination apparatus 124 is fluidically connected to ion-removal apparatus 112 via streams 114, 118, and 122. In certain embodiments, the desalination apparatus is fluidically connected to an optional pH reduction apparatus. For example, in FIG. 1, desalination apparatus 124 is fluidically connected to pH reduction apparatus 116 via streams 118 and 122. In certain embodiments, the desalination apparatus is fluidically connected to an optional VOM removal apparatus. For example, in FIG. 1, desalination apparatus 124 is fluidically connected to VOM removal apparatus 120 via stream 122.

In some embodiments, the desalination apparatus can be directly fluidically connected to a VOM removal apparatus. For example, in FIG. 1, desalination apparatus 124 is directly fluidically connected to VOM removal apparatus 120 via stream 122. In some embodiments, the desalination apparatus can be directly fluidically connected to one or more other unit operations. In some embodiments, the desalination apparatus is directly fluidically connected to a separator. In some embodiments, the desalination apparatus is directly fluidically connected to a suspended solids removal apparatus. In some embodiments, the desalination apparatus is directly fluidically connected to an ion-removal apparatus. According to certain embodiments, the desalination apparatus is directly fluidically connected to a pH reduction apparatus.

A variety of types of desalination apparatuses may be used in the embodiments described herein. In some embodiments, the desalination apparatus comprises a humidification-dehumidification desalination apparatus. In some embodiments, the humidification-dehumidification desalination apparatus is operated at a pressure below 1 atmosphere. In certain embodiments, the humidification-dehumidification desalination apparatus comprises a dehumidifier comprising a bubble column condenser. In some embodiments, the humidification-dehumidification desalination apparatus comprises a plurality of conduits configured to discretely vary the ratio of a mass flow rate of air to a mass flow rate of liquid at intermediate points in the humidifier and/or the dehumidifier.

Figure 2:
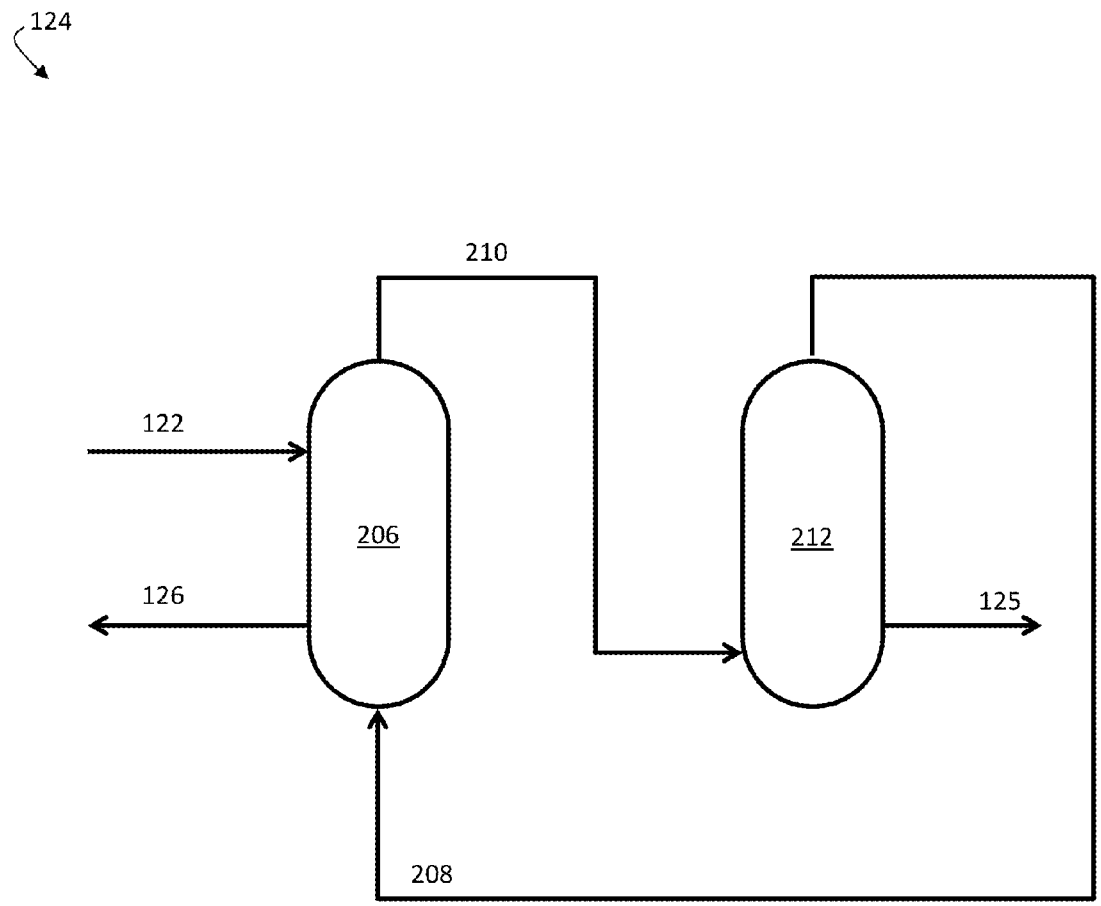
FIG. 2 is, according to some embodiments, a schematic illustration of an exemplary humidification-dehumidification desalination apparatus.

FIG. 2 is a schematic illustration of an exemplary humidification-dehumidification desalination apparatus 124 which may be used in association with certain of the inventive systems and methods described herein. In FIG. 2, desalination apparatus 124 comprises humidifier 206, which can be configured to receive stream 122 (which may correspond to, for example, stream 122 from FIG. 1). Humidifier 206 may also be configured to receive gaseous stream 208. Gaseous stream 208 may comprise any gas capable of carrying water vapor. For example, gaseous stream 208 may comprise air, nitrogen, oxygen, a noble gas (e.g., helium, argon, etc.), and/or any other suitable gas. Humidifier 206 can be configured, in some embodiments, such that water is evaporated from stream 122 into gaseous stream 208 to produce a humidified gaseous stream 210 and a concentrated saline stream 126. Desalination apparatus 124 further comprises dehumidifier 212 fluidically connected to humidifier 206. Dehumidifier 212 can be configured to condense at least a portion of the water from gaseous stream 210 to produce a water-containing stream 125 and a dehumidified gaseous stream.

In certain embodiments, the dehumidifier is directly fluidically connected to the humidifier. For example, in FIG. 2, dehumidifier 212 is directly fluidically connected (via streams 210 and 208) to humidifier 206. In other embodiments, the humidifier and dehumidifier can be arranged such that they are fluidically connected to each other but are not directly fluidically connected to each other.

The desalination apparatus may be operated as follows. A feed stream containing at least one dissolved salt (e.g., a dissolved monovalent salt) can be transported to the humidifier, according to certain embodiments. In some embodiments, water is removed from the stream fed to the desalination apparatus (e.g., an ion-diminished stream and/or another stream fed to the desalination apparatus) to produce a concentrated saline stream enriched in the dissolved monovalent salt relative to the feed stream. The concentrated saline stream can be produced, for example, by humidifying a gaseous stream. Referring to FIG. 2, for example, stream 122 containing at least one dissolved salt (e.g., at least one dissolved monovalent salt) and gaseous stream 208 can be fed to humidifier 206. In certain embodiments, humidifying the gaseous stream comprises contacting the gaseous stream with the stream fed to the desalination unit within the humidifier to evaporate at least a portion of the water from the feed stream into the gaseous stream. For example, in FIG. 2, water from stream 122 can be evaporated into gaseous stream 208 within humidifier 206 to produce a humidified gaseous stream 210 (which can contain water vapor) and a concentrated saline stream 126. Concentrated saline stream 126 can be transported away from the desalination apparatus and to a downstream processing apparatus.

Some embodiments comprise transporting the gaseous stream to a dehumidifier and condensing at least a portion of the water within the gaseous stream. For example, referring to FIG. 2, humidified gaseous stream 210 can be transported to dehumidifier 212, in which water can be condensed to form water-containing stream 125 and dehumidified gaseous stream 208. In certain embodiments, including the set of embodiments illustrated in FIG. 2, at least a portion of the dehumidified gaseous stream can be recycled to humidifier 206 (e.g., in a closed loop) and used to remove water from an aqueous solution fed to the humidifier. In other embodiments, the dehumidified stream from the dehumidifier can be transported elsewhere within the system and/or vented.

The humidifier may have any configuration that allows for the transfer of water from the desalination feed stream to the gaseous stream. In certain embodiments, the humidifier comprises a vessel (e.g., a stainless steel tank or other vessel). The humidifier vessel can comprise a first input configured to receive an aqueous saline feed stream (e.g., stream 122 in FIGS. 1 and 2) and a second input configured to receive a gaseous stream into which water from the aqueous saline feed stream is vaporized.

In some embodiments, the humidifier comprises a device configured to produce droplets of the aqueous saline stream when the aqueous saline feed stream is transported through the device. For example, a nozzle or other spraying device may be positioned at the top of the humidifier such that the aqueous feed stream is sprayed downward to the bottom of the humidifier. The use of a spraying device can increase the degree of contact between the aqueous saline stream fed to the humidifier and the gaseous stream into which water from the aqueous saline stream is transported. In some such embodiments, the gaseous stream can be transported in a counter-current direction, relative to the direction along which the aqueous saline stream is transported. For example, the gaseous stream may be transported into the bottom of the humidifier, through the humidifier vessel, and out of the top of the humidifier. In certain embodiments, the remaining portion of water that is not transported from the aqueous saline feed stream to the gaseous stream is collected at or near the bottom of the humidifier and transported out of the humidifier (and out of the desalination system) as a concentrated saline stream (e.g., stream 126 in FIGS. 1 and 2).

In certain embodiments, humidifier 206, stream 122, and/or stream 208 may be heated before and/or during the humidification step. Heating one or more of these streams may increase the degree to which water is transferred from the aqueous saline feed stream to the gaseous stream within the humidifier.

In some embodiments, humidifier 206 contains a packing material (e.g., polyvinyl chloride (PVC) packing material or other similar materials). The packing can facilitate turbulent gas flow and/or enhanced direct contact between the aqueous saline stream and the gaseous stream within the humidifier.

The humidifier may be of any size, which will generally depend upon the number of humidifier units employed in the system and the total flow rate of aqueous saline solution that is to be desalinated. In certain embodiments, the total of the volumes of the humidifiers used in the desalination system can be at least about 1 liter, at least about 10 liters, or at least about 100 liters (and/or, in some embodiments, up to about 1,000,000 liters, or more).

The dehumidifier may have any configuration that allows for the condensation of water from the vapor-containing gaseous stream fed to the dehumidifier. In certain embodiments, the dehumidifier comprises a vessel (e.g., a stainless steel tank or other vessel). The dehumidifier vessel can comprise a first input configured to receive a water-vapor-containing gaseous feed stream (e.g., stream 210 in FIG. 2). The dehumidifier vessel can comprise a first outlet configured to output a dehumidified gaseous stream (e.g., stream 208 in FIG. 2) and a second outlet configured to output a water-containing stream containing a relatively high percentage of water (e.g., stream 125 in FIGS. 1 and 2).

In certain embodiments, the dehumidifier is configured such that the gaseous stream directly contacts a liquid within the dehumidifier. Configuring the dehumidifier such that direct contact between the gaseous stream and condensed liquid is maintained within the dehumidifier can be, in some embodiments, advantageous, as heat transfer to the gaseous phase may be enhanced in some such embodiments, leading to more energy efficient condensation of the water vapor from the gaseous phase.

In certain embodiments, the dehumidifier comprises a bubble column condenser. Referring to FIG. 2, for example, humidified gaseous stream 210 from humidifier 206 may be transported to the bottom of dehumidifier 212, after which, the contents of stream 210 may be contacted with a condensed liquid at the bottom of dehumidifier 212. As the contents of humidified gaseous stream 210 are transported through the liquid within dehumidifier 212, at least a portion of the water vapor may be condensed and held at the bottom of the dehumidifier. Condensed water at the bottom of dehumidifier may be transported out of the dehumidifier via stream 125, and dehumidified gas may be transported out of the top of dehumidifier via stream 208.

The dehumidifier can comprise a single stage in which liquid and vapor-containing gas are contacted or multiple stages on which liquid and vapor-containing gas are contacted. Each stage of the bubble-column condenser may comprise a bubble generator, such as a sieve plate, at the bottom of the stage. During operation, the condensed liquid may collect above the bubble generator, and the humidified gaseous stream may be bubbled through the condensed liquid by passing the gaseous stream through the bubble generator.

In some embodiments, the humidifier in the humidification-dehumidification desalination apparatus comprises a bubble column humidifier.

When multiple-stage bubble column condensers are employed as dehumidification apparatuses, the inlet of the first stage can be coupled to the vapor-containing gas source and the outlet of the first stage can be coupled to the inlet of the second stage. Additional stages can be arranged such that outlets of a preceding stage are fluidically coupled to inlets of a subsequent stage, and the outlet of the final stage can be used as the outlet of the condenser (e.g., from which stream 208 originates in FIG. 2).

Suitable bubble-column condensers that may be used as the dehumidification apparatus in certain systems and methods described herein include those described in U.S. Patent Publication No. 2013/0075940, by Govindan et al., filed Jul. 12, 2012 as U.S. patent application Ser. No. 13/548,166, and entitled "Bubble-Column Vapor Mixture Condenser"; U.S. Provisional Patent Application No. 61/877,032, filed on Sep. 12, 2013 and entitled "Systems Including a Bubble Column Condenser"; and U.S. Provisional Patent Application No. 61/881,365, filed on Sep. 23, 2013 and entitled "Desalination Systems and Associated Methods," each of which is incorporated herein by reference in its entirety for all purposes.

The dehumidifier may be of any size, which will generally depend upon the number of dehumidifier units employed in the system and the total flow rate of aqueous saline solution that is to be desalinated. In certain embodiments, the total of the volumes of the dehumidifiers used in the desalination system can be at least about 1 liter, at least about 10 liters, or at least about 100 liters (and/or, in some embodiments, up to about 1,000,000 liters, or more).

It should be understood that the inventive systems and methods described herein are not limited to those including a humidification/dehumidification desalination apparatus, and that in other embodiments, other desalination apparatus types may be employed.

In some embodiments, the desalination apparatus comprises a mechanical vapor compression apparatus. The mechanical vapor compression apparatus, in some embodiments, has a pressure ratio of 1.1 or higher across the compression apparatus. The mechanical vapor compression apparatus comprises, according to certain embodiments, a vane compression device and/or an axial compression device.

In some embodiments, the desalination apparatus comprises a multi-effect distillation apparatus.

According to certain embodiments, the desalination apparatus comprises a multi-stage flash apparatus.

In certain embodiments, the desalination apparatus comprises a vacuum distillation apparatus.

The desalination apparatus comprises, in some embodiments, a membrane distillation apparatus. In certain embodiments, the membrane distillation apparatus is multi-staged.

In some embodiments, the desalination apparatus comprises a hybrid desalination apparatus comprising a first desalination unit and a second desalination unit.

In some embodiments, in the hybrid desalination apparatus, the first unit is a reverse osmosis unit and the second unit is a humidification-dehumidification desalination apparatus. The humidification-dehumidification desalination apparatus can have any of the properties described above. For example, in some embodiments, the humidification-dehumidification desalination apparatus is operated at a pressure below 1 atmosphere. In certain embodiments, the humidification-dehumidification desalination apparatus comprises a dehumidifier comprising a bubble column condenser. In some embodiments, the humidification-dehumidification desalination apparatus comprises a plurality of conduits configured to discretely vary the ratio of a mass flow rate of air to a mass flow rate of liquid at intermediate points in the humidifier and/or the dehumidifier.

In certain embodiments, in the hybrid desalination apparatus, the first unit is a reverse osmosis unit and the second unit is a mechanical vapor compression apparatus. The mechanical vapor compression apparatus can have any of the properties described above. For example, in some embodiments, the mechanical vapor compression apparatus has a pressure ratio of 1.1 or higher across the compression apparatus. In certain embodiments, the mechanical vapor compression apparatus comprises a vane compression device and/or an axial compression device.

In certain embodiments, in the hybrid desalination apparatus, the first unit comprises a reverse osmosis unit and the second unit is a multi-effect distillation apparatus.

In certain embodiments, in the hybrid desalination apparatus, the first unit is a reverse osmosis unit and the second unit is a multi-stage flash apparatus.

In certain embodiments, in the hybrid desalination apparatus, the first unit is a reverse osmosis unit and the second unit is a vacuum distillation apparatus.

In certain embodiments, in the hybrid desalination apparatus, the first unit is a reverse osmosis unit and the second unit is a membrane distillation apparatus. In some such embodiments, the membrane distillation apparatus is multi-staged.

In some embodiments, a disinfection unit can be included in the water treatment system. The disinfection unit may be, for example, a chlorination system configured to add chlorine to the water. According to some embodiments, the disinfection unit can be configured to receive at least a portion of the desalinated water containing stream produced by the desalination apparatus. For example, referring to FIG. 1, water treatment system 100 can comprise optional disinfection unit 130. Disinfection unit 130 can be configured to receive at least a portion of water containing stream 125 from desalination apparatus 124. In some embodiments, disinfection unit 130 can be configured to receive disinfectant stream 131, which can contain, for example, chlorine. Disinfection unit 130 can be configured to produce disinfected water containing stream 132.

While separator 102, suspended solids removal apparatus 108, ion-removal apparatus 112, pH reduction apparatus 116, VOM removal apparatus 120, and desalination apparatus 124 are shown in FIG. 1 as being arranged in a particular order, it should be understood that in other embodiments, these components may be alternatively arranged.

In some embodiments, for example, the input stream received by the suspended solids removal apparatus comprises at least a portion of the immiscible phase-diminished stream produced by the separator. That is to say, in certain embodiments, the suspended solids removal apparatus can be located downstream of the separator. Referring to FIG. 1, for example, input stream 106 received by suspended solids removal apparatus 108 comprises at least a portion of the immiscible phase-diminished stream (also stream 106) produced by separator 102. In other embodiments, the input stream received by the separator comprises at least a portion of the suspended solids-diminished stream produced by the suspended solids removal apparatus. That is to say, in certain embodiments, the separator can be located downstream of the suspended solids removal apparatus.

In certain embodiments, the input stream received by the ion-removal apparatus comprises at least a portion of the immiscible phase-diminished stream produced by the separator. That is to say, in certain embodiments, the ion-removal apparatus can be located downstream of the separator. Referring to FIG. 1, for example, input stream 110 received by ion-removal apparatus 112 comprises at least a portion of immiscible phase-diminished stream 106 produced by separator 102. In other embodiments, the input stream received by the separator comprises at least a portion of the ion-diminished stream produced by the ion-removal apparatus. That is to say, in certain embodiments, the separator can be located downstream of the ion-removal apparatus.

In certain embodiments, the input stream received by the pH reduction apparatus comprises at least a portion of the immiscible phase-diminished stream produced by the separator. That is to say, in certain embodiments, the pH reduction apparatus can be located downstream of the separator. Referring to FIG. 1, for example, input stream 114 received by pH reduction apparatus 116 comprises at least a portion of immiscible phase-diminished stream 106 produced by separator 102. In other embodiments, the input stream received by the separator comprises at least a portion of the pH-reduced stream produced by the pH reduction apparatus. That is to say, in certain embodiments, the separator can be located downstream of the pH reduction apparatus.

In some embodiments, the input stream received by the volatile organic material (VOM) removal apparatus comprises at least a portion of the immiscible phase-diminished stream produced by the separator. That is to say, in certain embodiments, the VOM removal apparatus can be located downstream of the separator. Referring to FIG. 1, for example, input stream 118 received by VOM removal apparatus 120 comprises at least a portion of immiscible phase-diminished stream 106 produced by separator 102. In other embodiments, the input stream received by the separator comprises at least a portion of the VOM-diminished stream produced by the VOM removal apparatus. That is to say, in certain embodiments, the separator can be located downstream of the VOM removal apparatus.

In some embodiments, the aqueous stream received by the desalination apparatus comprises at least a portion of the immiscible phase-diminished stream produced by the separator. That is to say, in certain embodiments, the desalination apparatus is downstream of the separator. For example, referring to FIG. 1, input stream 122 received by desalination apparatus 124 comprises at least a portion of immiscible phase-diminished stream 106 produced by separator 102.

In some embodiments, the input stream received by the ion-removal apparatus comprises at least a portion of the suspended-solids-diminished stream produced by the suspended solids removal apparatus. That is to say, in certain embodiments, the ion-removal apparatus can be located downstream of the suspended solids removal apparatus. Referring to FIG. 1, for example, input stream 110 received by ion-removal apparatus 112 comprises at least a portion of suspended solids-diminished stream (also stream 110) produced by suspended solids removal apparatus 108. In other embodiments, the input stream received by the suspended solids removal apparatus comprises at least a portion of the ion-diminished stream produced by the ion-removal apparatus. That is to say, in certain embodiments, the suspended solids removal apparatus can be located downstream of the ion-removal apparatus.

In certain embodiments, the input stream received by the pH reduction apparatus comprises at least a portion of the suspended-solids-diminished stream produced by the suspended solids removal apparatus. That is to say, in certain embodiments, the pH reduction apparatus can be located downstream of the suspended solids removal apparatus. Referring to FIG. 1, for example, input stream 114 received by pH reduction apparatus 116 comprises at least a portion of suspended solids diminished stream 110 produced by suspended solids removal apparatus 108. In other embodiments, the input stream received by the suspended solids removal apparatus comprises at least a portion of the pH-reduced stream produced by the pH reduction apparatus. That is to say, in certain embodiments, the suspended solids removal apparatus can be located downstream of the pH reduction apparatus.

In some embodiments, the input stream received by the VOM removal apparatus comprises at least a portion of the suspended-solids-diminished stream produced by the suspended solids removal apparatus. That is to say, in certain embodiments, the VOM removal apparatus can be located downstream of the suspended solids removal apparatus. Referring to FIG. 1, for example, input stream 118 received by VOM removal apparatus 120 comprises at least a portion of suspended solids-diminished stream 110 produced by suspended solids removal apparatus 108. In other embodiments, the input stream received by the suspended solids removal apparatus comprises at least a portion of the VOM-diminished stream produced by the VOM removal apparatus. That is to say, in certain embodiments, the suspended solids removal apparatus can be located downstream of the VOM removal apparatus.

In some embodiments, the aqueous stream received by the desalination apparatus comprises at least a portion of the suspended solids-diminished stream produced by the suspended solids removal apparatus. That is to say, in certain embodiments, the desalination apparatus is downstream of the suspended solids removal apparatus. For example, referring to FIG. 1, input stream 122 received by desalination apparatus 124 comprises at least a portion of suspended solids-diminished stream 110 produced by suspended solids removal apparatus 108.

In certain embodiments, the input stream received by the pH reduction apparatus comprises at least a portion of the ion-diminished stream produced by the ion-removal apparatus. That is to say, in certain embodiments, the pH reduction apparatus can be located downstream of the ion-removal apparatus. Referring to FIG. 1, for example, input stream 114 received by pH reduction apparatus 116 comprises at least a portion of ion-diminished stream (also stream 114) produced by ion-removal apparatus 112. In other embodiments, the input stream received by the ion-removal apparatus comprises at least a portion of the pH-reduced stream produced by the pH reduction apparatus. That is to say, in certain embodiments, the ion-removal apparatus can be located downstream of the pH reduction apparatus.

In some embodiments, the input stream received by the VOM removal apparatus comprises at least a portion of the ion-diminished stream produced by the ion-removal apparatus. That is to say, in certain embodiments, the VOM removal apparatus can be located downstream of the ion-removal apparatus. Referring to FIG. 1, for example, input stream 118 received by VOM removal apparatus 120 comprises at least a portion of ion-diminished stream 114 produced by ion-removal apparatus 112. In other embodiments, the input stream received by the ion-removal apparatus comprises at least a portion of the VOM-diminished stream produced by the VOM removal apparatus. That is to say, in certain embodiments, the ion-removal apparatus can be located downstream of the VOM removal apparatus.

In some embodiments, the aqueous stream received by the desalination apparatus comprises at least a portion of the ion-diminished stream produced by the ion-removal apparatus. That is to say, in certain embodiments, the desalination apparatus is downstream of the ion-removal apparatus. For example, referring to FIG. 1, input stream 122 received by desalination apparatus 124 comprises at least a portion of ion-diminished stream 114 produced by ion-removal apparatus 112.

In some embodiments, the input stream received by the VOM removal apparatus comprises at least a portion of the pH-reduced stream produced by the pH reduction apparatus. That is to say, in certain embodiments, the VOM removal apparatus can be located downstream of the pH reduction apparatus. Referring to FIG. 1, for example, input stream 118 received by VOM removal apparatus 120 comprises at least a portion of pH-reduced stream (also stream 118) produced by pH reduction apparatus 116. In other embodiments, the input stream received by the pH reduction apparatus comprises at least a portion of the VOM-diminished stream produced by the VOM removal apparatus. That is to say, in certain embodiments, the pH reduction apparatus can be located downstream of the VOM removal apparatus.

In some embodiments, the aqueous stream received by the desalination apparatus comprises at least a portion of the pH-reduced stream produced by the pH reduction apparatus. That is to say, in certain embodiments, the desalination apparatus is downstream of the pH reduction apparatus. For example, referring to FIG. 1, input stream 122 received by desalination apparatus 124 comprises at least a portion of pH reduced stream 118 produced by pH reduction apparatus 116.

In some embodiments, the aqueous stream received by the desalination apparatus comprises at least a portion of the VOM-diminished stream produced by the VOM removal apparatus. That is to say, in certain embodiments, the desalination apparatus is downstream of the VOM removal apparatus. For example, referring to FIG. 1, input stream 122 received by desalination apparatus 124 comprises at least a portion of VOM-diminished stream (also stream 122) produced by VOM removal apparatus 120. In other embodiments, the input stream received by the VOM removal apparatus comprises at least a portion of the water-containing, low salt concentration stream produced by the desalination apparatus. That is to say, in certain embodiments, the VOM removal apparatus can be located downstream of the desalination apparatus.

Each of separator 102, suspended solids removal apparatus 108, ion-removal apparatus 112, pH reduction apparatus 116, and VOM removal apparatus 120 is an optional feature of the water treatment system. In some embodiments, the water treatment system comprises only one of separator 102, suspended solids removal apparatus 108, ion-removal apparatus 112, pH reduction apparatus 116, and VOM removal apparatus 120. In some embodiments, the water treatment system comprises any combination of two or more of separator 102, suspended solids removal apparatus 108, ion-removal apparatus 112, pH reduction apparatus 116, and VOM removal apparatus 120.

Various of the unit operations described herein can be "directly fluidically connected" to other unit operations and/or components. Generally, a direct fluid connection exists between a first unit operation and a second unit operation (and the two unit operations are said to be "directly fluidically connected" to each other) when they are fluidically connected to each other and the composition of the fluid does not substantially change (i.e., no fluid component changes in relative abundance by more than 5% and no phase change occurs) as it is transported from the first unit operation to the second unit operation. As an illustrative example, a stream that connects first and second unit operations, and in which the pressure and temperature of the fluid is adjusted but the composition of the fluid is not altered, would be said to directly fluidically connect the first and second unit operations. If, on the other hand, a separation step is performed and/or a chemical reaction is performed that substantially alters the composition of the stream contents during passage from the first component to the second component, the stream would not be said to directly fluidically connect the first and second unit operations.

Figure 3:
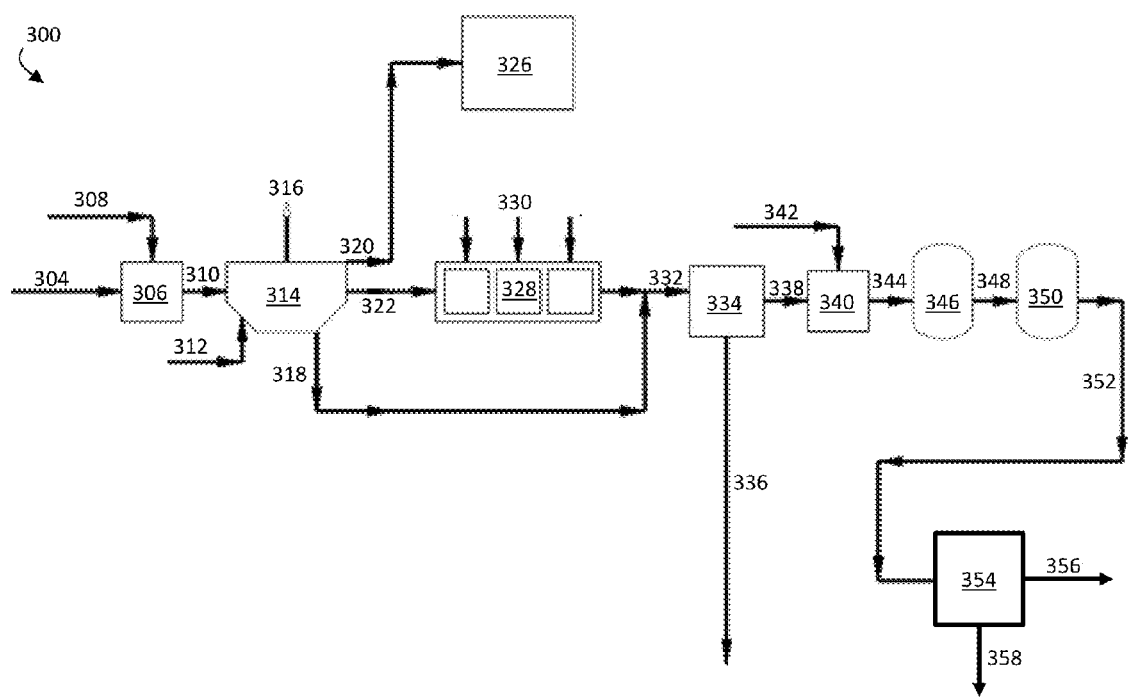
FIG. 3 is a schematic illustration of an exemplary water treatment system, according to one set of embodiments.

FIG. 3 is a schematic illustration of an exemplary water treatment system 300, according to certain embodiments. In FIG. 3, aqueous input stream 304 is transported to optional tank 306. In some embodiments, chemicals are added to optional tank 306 via stream 308. The chemicals can be selected to aid in a downstream apparatus, according to certain embodiments. For example, in some embodiments, a skimmer (which can be part of a dissolved gas flotation apparatus, for example) can be positioned downstream of tank 306, and the chemicals added to tank 306 are selected to aid in operation of the skimmer (e.g., in a dissolved gas flotation process). Aqueous stream 310 can be transported out of tank 306. Aqueous stream 310 can be transported to skimmer 314. In some embodiments, skimmer 314 can be configured to remove at least a portion of a suspended and/or emulsified water-immiscible phase within stream 310 to produce an immiscible phase-diminished stream 322 (and, in some embodiments, immiscible phase-diminished stream 318). The water-immiscible phase from skimmer 314 can be transported, for example, to a recovery tank 326 via stream 320. In some embodiments, skimmer 314 is part of a dissolved gas flotation apparatus. In some such embodiments, compressed gas (e.g., air) can be added, via stream 312, to a tank containing the treated water, which can aid in the transport of immiscible material to the top of the tank. Gas can subsequently be transported out of the tank via stream 316.

In some embodiments, ion-removal apparatus 328 can be configured to receive at least a portion of immiscible phase-diminished stream 322. In some embodiments, ion-removal apparatus 328 is configured to remove at least a portion of scale forming ions within stream 322 to produce an ion-diminished stream 332. In some such embodiments, ion-removal apparatus 328 produces ion-diminished stream 332 using a chemical reagent. For example, in FIG. 3, chemical reagent can be transported to ion-removal apparatus 328 via stream 330. The chemical reagent can be, for example, soda ash, caustic soda, and the like.

In certain embodiments, a portion of the immiscible phase-diminished stream produced by skimmer 314 can bypass ion-removal apparatus 328. For example, in FIG. 3, at portion of the immiscible phase-diminished stream from skimmer 314 bypasses ion-removal apparatus 328 via stream 318. The contents of bypass stream 318 may be merged with the contents of stream 332 downstream of ion-removal apparatus 328.

In some embodiments, a filter in configured to receive at least a portion of the immiscible phase-diminished stream and/or at least a portion of the ion diminished stream. For example, in FIG. 3, filter 334 is configured to received ion-diminished stream 332 and/or immiscible phase-diminished stream 318. In certain embodiments, filter 334 is configured to remove at least a portion of suspended solids from the immiscible phase-diminished stream portion and/or the ion-diminished stream portion received by the filter to produce a suspended-solids-diminished stream. For example, in FIG. 3, filter 334 is configured to remove at least a portion of suspended solids from stream 332 to produce suspended-solids-diminished stream 338. In addition, in FIG. 3, filter 334 is configured to produce solids-containing stream 336.

In certain embodiments, a pH reduction step can be included in the process. For example, in FIG. 3, optional tank 340 can be configured to receive suspended-solids-diminished stream 338 and to output pH-reduced stream 344. Tank 340 can be configured, in some embodiments, to receive an acid and/or a base via stream 342. In some such embodiments, acid and/or base may be added to tank 340 until the pH of the contents of tank 340 reaches a desired level. According to certain embodiments, the contents of tank 340 may be output via stream 344, once the pH has reached a desired level. In certain embodiments, tank 340 is a reactor, such as a continuous flow stirred tank reactor. In some such embodiments, acid and/or base can be constantly fed at a rate such that the reactor effluent reaches a desired pH level.

In some embodiments, optional filter 346 can be included in the system. Filter 346 can be used to remove one or more solid materials from pH-reduced stream 344 to produce filtered stream 348.

According to certain embodiments, a carbon bed is configured to receive at least a portion of the suspended-solidsdiminished stream. For example, in FIG. 3, carbon bed 350 is configured to receive stream 348, which contains at least a portion of the suspended-solids-diminished stream produced by filter 334. Carbon bed 350 can be configured to remove at least a portion of VOM from the suspended-solids-diminished stream portion received by the carbon bed to produce a VOM-diminished stream. For example, in FIG. 3, carbon bed 350 is configured to produce VOM-diminished stream 352.

In some embodiments, desalination apparatus is configured to receive at least a portion of the VOM-diminished stream and to remove at least a portion of water from the VOM diminished stream received by the desalination apparatus. For example, in FIG. 3 desalination apparatus 354 is configured to receive VOM-diminished stream 352. In addition, desalination apparatus 354 is configured to produce concentrated saline stream 356, which is enriched in at least one dissolved monovalent salt relative to VOM-diminished stream 352. In some embodiments, the desalination apparatus can also produce a water-containing stream that contains a lower concentration of the dissolved salt (e.g., dissolved monovalent salt) than the stream fed to the desalination apparatus. For example, in FIG. 3, desalination apparatus 354 can be configured to produce water-containing stream 358, which contains less of a dissolved salt (e.g., less of a dissolved monovalent salt) than stream 352 fed to desalination apparatus 354.

In certain embodiments, the order of the desalination apparatus and the carbon bed can be switched, relative to the order shown in FIG. 3. For example, in some embodiments, the desalination apparatus is configured to receive at least a portion of the suspended-solids-diminished stream, and to remove at least a portion of water from the suspended-solids-diminished stream portion received by the desalination apparatus to produce a concentrated saline stream enriched in a dissolved monovalent salt relative to the suspended-solids-diminished stream portion received by the desalination apparatus. The desalination apparatus can also be configured to produce a water-containing stream containing less of the dissolved monovalent salt than the suspended-solids-diminished stream. In some such embodiments, the carbon bed can be configured to receive at least a portion of the water-containing stream produced by the desalination apparatus, and to remove at least a portion of VOM from the water-containing stream portion received by the carbon bed to produce a VOM-diminished stream.

Figure 4:
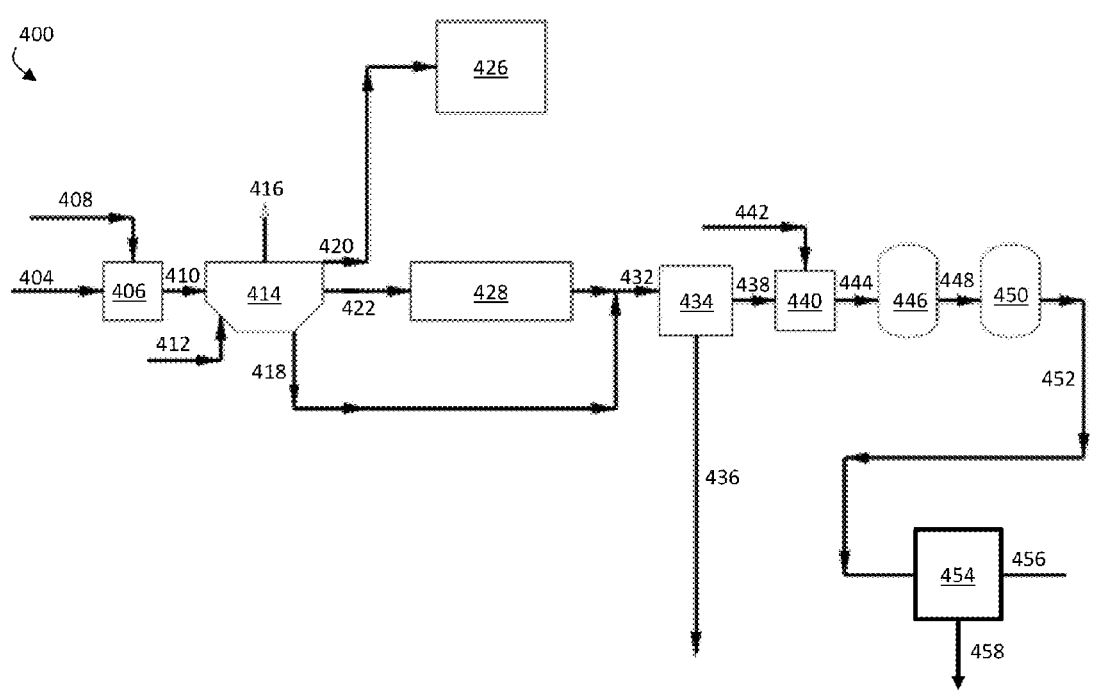
FIG. 4 is, according to certain embodiments, a schematic illustration of an exemplary water treatment system.

FIG. 4 is a schematic illustration of another exemplary water treatment system 400, according to certain embodiments. In FIG. 4, aqueous input stream 404 is transported to optional tank 406. In some embodiments, chemicals are added to optional tank 406 via stream 408. The chemicals can be selected to aid in a downstream apparatus, according to certain embodiments. For example, in some embodiments, a skimmer (which can be part of a dissolved gas flotation apparatus, for example) can be positioned downstream of tank 406, and the chemicals added to tank 406 are selected to aid in operation of the skimmer (e.g., in a dissolved gas flotation process). Aqueous stream 410 can be transported out of tank 406. Aqueous stream 410 can be transported to skimmer 414. In some embodiments, skimmer 414 can be configured to remove at least a portion of suspended and/or emulsified water-immiscible phase within stream 410 to produce an immiscible phase-diminished stream 422 (and, in some embodiments, immiscible phase-diminished stream 418). The water-immiscible phase from skimmer 414 can be transported, for example, to a recovery tank 426 via stream 420. In some embodiments, skimmer 414 is part of a dissolved gas flotation apparatus. In some such embodiments, compressed gas (e.g., air) can be added, via stream 412, to a tank containing the treated water, which can aid in the transport of immiscible material to the top of the tank. Gas can subsequently be transported out of the tank via stream 416.

In some embodiments, electrocoagulation apparatus 428 can be configured to receive at least a portion of water-immiscible phase-diminished stream 422. Electrocoagulation apparatus 428 can be configured to remove at least a portion of scale forming ions within stream 422 to produce an ion-diminished stream 432.

In certain embodiments, a portion of water-immiscible phase-diminished stream produced by skimmer 414 can bypass electrocoagulation apparatus 428. For example, in FIG. 4, a portion of the immiscible phase-diminished product from skimmer 414 bypasses electrocoagulation apparatus 428 via stream 418. The contents of bypass stream 418 may be merged with the contents of stream 432 downstream of electrocoagulation apparatus 428.

Filter 434 can be configured to receive ion-diminished stream 432 and/or immiscible phase-diminished stream 418. Filter 434 can be configured to remove at least a portion of suspended solids from stream 432 to produce suspended-solids-diminished stream 438. In addition, filter 434 can be configured to produce solids-containing stream 436.

In certain embodiments, a pH reduction step can be included in the process. For example, in FIG. 4, optional tank 440 can be configured to receive suspended-solids-diminished stream 438 and to produce pH-reduced stream 444. Optional tank 440 can be configured, in some embodiments, to receive an acid and/or a base via stream 442. In some such embodiments, acid and/or base may be added to tank 440 until the pH of the contents of tank 440 reaches a desired level. In certain embodiments, tank 440 is a reactor, such as a continuous flow stirred tank reactor. In some such embodiments, acid and/or base can be constantly fed at a rate such that the reactor effluent reaches a desired pH level. According to certain embodiments, the contents of tank 440 may be output via stream 444, once the pH has reached a desired level.

In some embodiments, optional filter 446 can be included in the system. Filter 446 can be used to remove one or more solid materials from pH-reduced stream 444 to produce filtered stream 448.

Carbon bed 450 can be configured to receive stream 448, which contains at least a portion of the suspended-solids-diminished stream produced by filter 434. Carbon bed 450 can be configured to remove at least a portion of VOM from the suspended-solids-diminished stream portion received by the carbon bed to produce a VOM-diminished stream 452.

Desalination apparatus 454 can be configured to receive VOM-diminished stream 452. Desalination apparatus 454 can be configured to produce concentrated saline stream 456, which is enriched in at least one dissolved monovalent salt relative to VOM-diminished stream 452. Desalination apparatus 454 can also be configured to produce water-containing stream 458, which contains less of a dissolved salt (e.g., less of a dissolved monovalent salt) than stream 452 fed to desalination apparatus 454.

In certain embodiments, the order of the desalination apparatus and the carbon bed can be switched, relative to the order shown in FIG. 4. For example, in some embodiments, the desalination apparatus is configured to receive at least a portion of the suspended-solids-diminished stream, and to remove at least a portion of water from the suspended-solids-diminished stream portion received by the desalination apparatus to produce a concentrated saline stream enriched in a dissolved monovalent salt relative to the suspended-solids-diminished stream portion received by the desalination apparatus. The desalination apparatus can also be configured to produce a water-containing stream containing less of the dissolved monovalent salt than the suspended-solids-diminished stream. In some such embodiments, the carbon bed can be configured to receive at least a portion of the water-containing stream produced by the desalination apparatus, and to remove at least a portion of VOM from the water-containing stream portion received by the carbon bed to produce a VOM-diminished stream.

Figure 5:
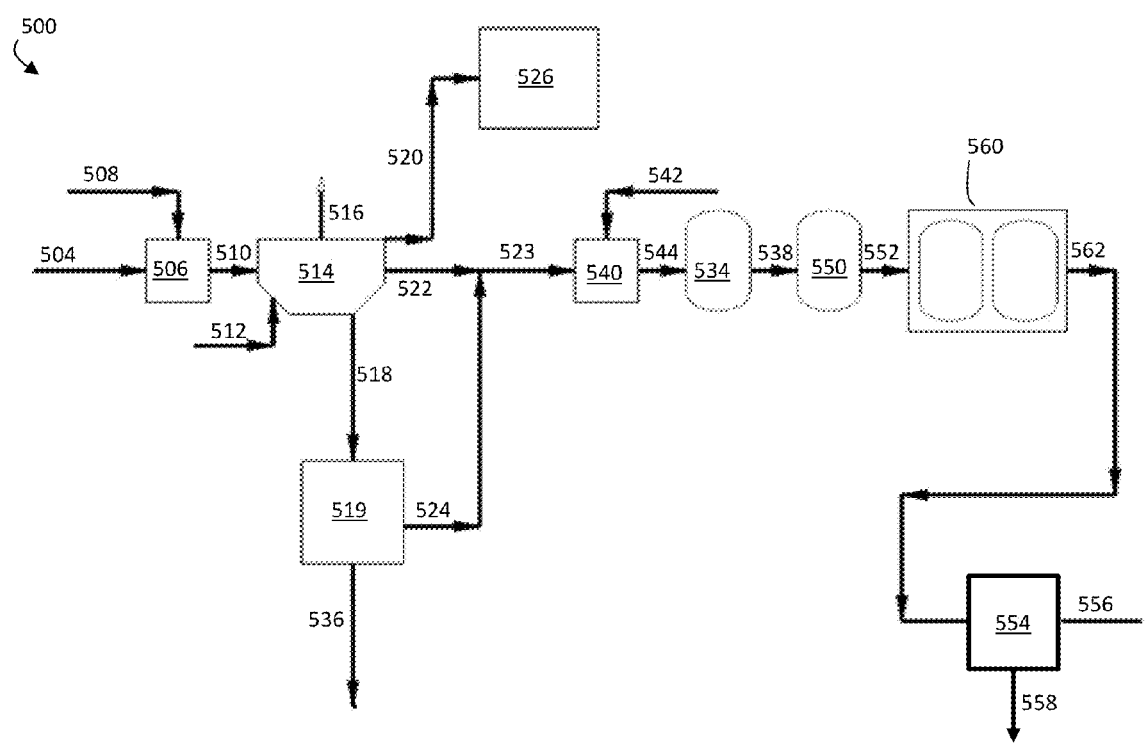
FIG. 5 is, according to some embodiments, a schematic illustration of an exemplary water treatment system.

FIG. 5 is a schematic illustration of another exemplary water treatment system 500, according to certain embodiments. In FIG. 5, aqueous input stream 504 is transported to optional tank 506. In some embodiments, chemicals are added to optional tank 506 via stream 508. The chemicals can be selected to aid in a downstream apparatus, according to certain embodiments. For example, in some embodiments, a skimmer (which can be part of a dissolved gas flotation apparatus, for example) can be positioned downstream of tank 506, and the chemicals added to tank 506 are selected to aid in operation of the skimmer (e.g., in a dissolved gas flotation process). Aqueous stream 510 can be transported out of tank 506. Aqueous stream 510 can be transported to skimmer 514. In some embodiments, skimmer 514 can be configured to remove at least a portion of suspended and/or emulsified water-immiscible phase within stream 510 to produce an immiscible phase-diminished stream 522 (and, in some embodiments, immiscible phase-diminished stream 518). The water-immiscible phase from skimmer 514 can be transported, for example, to a recovery tank 526 via stream 520. In some embodiments, skimmer 514 is part of a dissolved gas flotation apparatus. In some such embodiments, compressed gas (e.g., air) can be added, via stream 512, to a tank containing the treated water, which can aid in the transport of immiscible material to the top of the tank. Gas can subsequently be transported out of the tank via stream 516.

In certain embodiments, a portion of water-immiscible phase-diminished stream produced by skimmer 514 can be transported to filter 519, for example, via stream 518. filter 519 can be configured to remove at least a portion of suspended solids from immiscible phase-diminished stream portion 518 received by filter 519 to produce a suspended-solids-diminished stream 524. Filter 519 can also be configured to produce a solids-containing stream 536.

In some embodiments, a portion of the water-immiscible phase-diminished stream produced by skimmer 514 can bypass filter 519. For example, in FIG. 5, a portion 522 of the immiscible phase-diminished product from skimmer 514 bypasses filter 519 via stream 522. The contents of bypass stream 522 may be merged with the contents of stream 524 downstream of filter 519 and skimmer 514 to produce stream 523.

In certain embodiments, an optional pH reduction step can be included in the process. For example, in FIG. 5, optional tank 540 can be configured to receive suspended-solids-diminished stream 523 and to produce pH-reduced stream 544. Optional tank 540 can be configured, in some embodiments, to receive an acid and/or a base via stream 542. In some such embodiments, acid and/or base may be added to tank 540 until the pH of the contents of tank 540 reaches a desired level. In certain embodiments, tank 540 is a reactor, such as a continuous flow stirred tank reactor. In some such embodiments, acid and/or base can be constantly fed at a rate such that the reactor effluent reaches a desired pH level. According to certain embodiments, the contents of tank 540 may be output via stream 544, once the pH has reached a desired level.

In some embodiments, media filter 534 can be configured to receive pH-reduced stream 544 (and/or suspended solids-diminished stream 523). Media filter 534 can be configured to remove at least a portion of suspended solids from stream 544 to produce stream 538.

In some embodiments, a carbon bed can be included in the system. For example, referring to FIG. 5, Carbon bed 550 can be configured to receive stream 538, which contains at least a portion of the stream produced by filter 534. Carbon bed 550 can be configured to remove at least a portion of VOM from the stream received by the carbon bed to produce a VOM-diminished stream 552.

In some embodiments, a resin bed can be included in the system. For example, in FIG. 5, resin bed 560 can be configured to receive at least a portion of VOM-diminished stream 552. Resin bed 560 can be configured to remove at least a portion of at least one scale-forming ion from VOM-diminished stream portion 552 received by resin bed 560 to produce ion-diminished stream 562 containing less of the scale-forming ion relative to input stream 552 received by resin bed 560.

In some embodiments, desalination apparatus 554 can be configured to receive ion-diminished stream 562. Desalination apparatus 554 can be configured to produce concentrated saline stream 556, which is enriched in at least one dissolved monovalent salt relative to ion-diminished stream 562. Desalination apparatus 554 can also be configured to produce water-containing stream 558, which contains less of a dissolved salt (e.g., less of a dissolved monovalent salt) than stream 562 fed to desalination apparatus 554.

In certain embodiments, the order of the desalination apparatus and the carbon bed can be switched, relative to the order shown in FIG. 5. For example, in some embodiments, the desalination apparatus is configured to receive at least a portion of the suspended-solids-diminished stream, and to remove at least a portion of water from the suspended-solids-diminished stream portion received by the desalination apparatus to produce a concentrated saline stream enriched in a dissolved monovalent salt relative to the suspended-solids-diminished stream portion received by the desalination apparatus. The desalination apparatus can also be configured to produce a water-containing stream containing less of the dissolved monovalent salt than the suspended-solids-diminished stream. In some such embodiments, the carbon bed can be configured to receive at least a portion of the water-containing stream produced by the desalination apparatus, and to remove at least a portion of VOM from the water-containing stream portion received by the carbon bed to produce a VOM-diminished stream.

In some embodiments, the water treatment system comprises a precipitation apparatus. Referring back to the exemplary embodiment of FIG. 1, water treatment system 100 comprises optional precipitation apparatus 134. The precipitation apparatus may be, in certain embodiments, fluidically connected to the desalination apparatus. In some such embodiments, the precipitation apparatus is configured to receive at least a portion of a concentrated saline stream output by the desalination apparatus. For example, in FIG. 1, precipitation apparatus 134 is fluidically connected to desalination apparatus 124 and configured to receive concentrated saline stream 126 from desalination apparatus 124.

The precipitation apparatus is, in certain embodiments, configured to precipitate at least a portion of the dissolved monovalent salt from the concentrated saline stream to produce a product stream containing less of the dissolved monovalent salt relative to the concentrated saline stream. For example, in FIG. 1, precipitation apparatus 134 can be configured such that at least a portion of the dissolved monovalent salt within concentrated saline stream 126 precipitates within precipitation apparatus 134 to produce water-containing product stream 136, which contains less dissolved monovalent salt than concentrated saline stream 126.

The precipitation apparatus can be manufactured in any suitable manner. In certain embodiments, the precipitation apparatus comprises a vessel, such as a crystallization tank. The vessel may include an inlet through which at least a portion of the concentrated saline stream produced by the desalination apparatus is transported into the precipitation vessel. The precipitation vessel may also include at least one outlet. For example, the precipitation vessel may include an outlet through which the water containing stream (containing the dissolved monovalent salt in an amount that is less than that contained in the inlet stream) is transported. In some embodiments, the precipitation vessel includes an outlet through which solid, precipitated salt is transported, such as outlet 138 in FIG. 1.

In some embodiments, the crystallization tank comprises a low shear mixer. The low shear mixer can be configured to keep the crystals that are formed mixed (e.g., homogeneously mixed) in the brine stream. According to certain embodiments, the vessel is sized such that there is sufficient residence time for crystals to form and grow. In certain embodiments, the precipitation apparatus comprises a vessel which provides at least 20 minutes of residence time for the concentrated saline stream. As one non-limiting example, the vessel comprises, according to certain embodiments, a 6000 gallon vessel, which can be used to provide 24 minutes of residence in a 500 US barrel per day fresh water production system.

Those of ordinary skill in the art are capable of determining the residence time of a volume of fluid in a vessel. For a batch (i.e., non-flow) system, the residence time corresponds to the amount of time the fluid spends in the vessel. For a flow-based system, the residence time is determined by dividing the volume of the vessel by the volumetric flow rate of the fluid through the vessel.

In some embodiments the crystallization tank is followed by a storage tank. The storage tank may have, in some embodiments, a capacity that is substantially the same as the capacity of the crystallization tank. In certain embodiments, the crystallization tank and/or the storage tank can be configured to accommodate batch operation of the downstream solid handling apparatus, which can be fluidically coupled to the precipitation apparatus.

In some embodiments, the precipitation apparatus comprises at least one vessel comprising a volume within which the concentrated saline stream is substantially quiescent. In some embodiments, the flow rate of the fluid within the substantially quiescent volume is less than the flow rate at which precipitation (e.g., crystallization) is inhibited. For example, the flow rate of the fluid within the substantially quiescent volume may have, in certain embodiments, a flow rate of zero. In some embodiments, the flow rate of the fluid within the substantially quiescent volume may have a flow rate that is sufficiently high to suspend the formed solids (e.g., crystals), but not sufficiently high to prevent solid formation (e.g., crystal nucleation). The substantially quiescent volume within the vessel may occupy, in some embodiments, at least about 1%, at least about 5%, at least about 10%, or at least about 25% of the volume of the vessel.

As one particular example, the precipitation apparatus can comprise a vessel including a stagnation zone. The stagnation zone may be positioned, for example, at the bottom of the precipitation vessel. In certain embodiments, the precipitation apparatus can include a second vessel in which the solids precipitated in the first vessel are allowed to settle. For example, an aqueous stream containing the precipitated solids can be transported to a crystallization tank, where the solids can be allowed to settle. The remaining contents of the aqueous stream can be transported out of the crystallization tank. While the use of two vessels within the precipitation apparatus has been described, it should be understood that, in other embodiments, a single vessel, or more than two vessels may be employed. In certain embodiments, the desalination system can be operated such that precipitation of the salt occurs substantially only within the stagnation zone of the precipitation vessel.

In certain embodiments, the precipitation apparatus is directly fluidically connected to the desalination apparatus. For example in FIG. 1, precipitation apparatus 134 is directly fluidically connected to desalination apparatus 124 via concentrated saline stream 126. It should be understood, however, that the invention is not limited to embodiments in which the precipitation apparatus and the desalination apparatus are directly fluidically connected, and in other embodiments, the precipitation apparatus and the desalination apparatus are fluidically connected but are not directly fluidically connected.

In some embodiments, the precipitated salt from the precipitation apparatus is fed to a solids-handling apparatus. The solids-handling apparatus may be configured, in certain embodiments, to remove at least a portion of the water retained by the precipitated monovalent salt. In some such embodiments, the solids-handling apparatus is configured to produce a cake comprising at least a portion of the precipitated monovalent salt from the precipitation apparatus. As one example, the solids-handling apparatus can comprise a filter (e.g., a vacuum drum filter or a filter press) configured to at least partially separate the precipitated salt from the remainder of a suspension containing the precipitated salt. In some such embodiments, at least a portion of the liquid within the salt suspension can be transported through the filter, leaving behind solid precipitated salt. As one non-limiting example, a Larox FP 2016-8000 64/64 M40 PP/PP Filter (Outotech, Inc.) may be used as the filter. The filter may comprise, in certain embodiments, a conveyor filter belt which filters the salt from a suspension containing the salt.

In some embodiments, the desalination system comprises a transport device configured to transport precipitated monovalent salt away from the precipitation apparatus. For example, in certain embodiments, a pump is used to transport a suspension of the precipitated monovalent salt away from the precipitation apparatus. In other embodiments, a conveyor could be used to transport precipitated salt away from the precipitation apparatus. In certain embodiments, the transport device is configured to transport the precipitated monovalent salt from the precipitation apparatus to a solids-handling apparatus.

The stream that is input to the water treatment system (e.g., streams 104 in FIG. 1, 304 in FIG. 3, 404 in FIG. 4, and/or 504 in FIG. 5) can originate from a variety of sources. For example, in certain embodiments, at least a portion of a stream fed to the water treatment system comprises and/or is derived from seawater, ground water, brackish water, and/or the effluent of a chemical process (e.g., the effluent of another desalination system, or another chemical process).

Certain of the systems described herein can be configured to desalinate saline solutions entering at relatively high flow rates, and accordingly, can be configured to produce relative pure water streams at relatively high flow rates. For example, in some embodiments, the systems and methods described herein may be operated to receive an aqueous saline feed stream (e.g., streams 104 in FIG. 1, 304 in FIG. 3, 404 in FIG. 4, and/or 504 in FIG. 5) at a flow rate of at least about 1 gallon/minute, at least about 10 gallons/minute, at least about 100 gallons/minute, or at least about 1000 gallons/minute (and/or, in certain embodiments, up to about 10,000 gallons/minute, or more).

In certain embodiments, the water treatment system is operated such that little or no brine is left to be disposed from the system (also sometimes referred to as a "zero liquid discharge" system). In some such embodiments, the system produces a salt product and a fresh water product. The salt product can be produced, for example, as a product of a crystallization or other precipitation step.

It should be understood that, in embodiments in which a single unit is shown in the figures and/or is described as performing a certain function, the single unit could be replaced with multiple units (e.g., operated in parallel) performing a similar function. For example, in certain embodiments, any one or more of the separator, suspended solids removal apparatus, ion-removal apparatus, pH reduction apparatus, VOM removal apparatus, and/or desalination apparatus could correspond to a plurality of separators, suspended solids removal apparatuses, ion-removal apparatuses, pH reduction apparatuses, VOM removal apparatuses, and/or desalination apparatuses (e.g., configured to be operated in parallel).

It should also be understood that, where separate units are shown in the figures and/or described as performing a sequence of certain functions, the units may also be present as a single unit (e.g., within a common housing), and the single unit may perform a combination of functions. For example, in some embodiments, any two or more of the separator, the suspended solids removal apparatus, the ion-removal apparatus, the pH reduction apparatus, and the VOM removal apparatus can be a single unit which can perform each of the functions associated with the combination.

As particular examples, in some embodiments, the system comprises a single unit that acts as both an ion-removal apparatus and a separator. In certain embodiments, the system comprises a single unit that acts as both an ion-removal apparatus and a suspended solids removal apparatus. In certain embodiments, the system comprises a single unit that acts as both an ion-removal apparatus and a pH reduction apparatus. In certain embodiments, the system comprises a single unit that acts as both an ion-removal apparatus and a VOM removal apparatus. As additional examples, in some embodiments, the system comprises a single unit that acts as both a separator and a suspended solids removal apparatus. In some embodiments, the system comprises a single unit which acts as both a separator and an ion-removal apparatus. In certain embodiments, the system comprises a single unit that acts as both a separator and a pH reduction apparatus. In certain embodiments, the system comprises a single unit that acts as both a separator and a VOM removal apparatus. As still further examples, in some embodiments, the system comprises a suspended solids removal apparatus and a pH reduction apparatus. In some embodiments, the system comprises a single unit which acts as both a suspended solids removal apparatus and a VOM removal apparatus. In some embodiments, the system comprises a single unit which acts as both a pH reduction apparatus and a VOM removal apparatus. Units that perform three, four, or five of the functions outlined above are also possible. Of course, the invention is not necessarily limited to combination units, and in some embodiments, any of the separator, the suspended solids removal apparatus, the ion-removal apparatus, the pH reduction apparatus, and/or the VOM removal apparatus may be standalone units.

In some embodiments, the desalination apparatus is separate from each of the separator, the suspended solids removal apparatus, the ion-removal apparatus, the pH reduction apparatus, and the VOM removal apparatus.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A water treatment system, comprising:
    an ion-removal apparatus configured to remove at least a portion of at least one scale-forming ion from an input stream received by the ion-removal apparatus to produce an ion-diminished stream containing less of the scale-forming ion relative to the input stream received by the ion-removal apparatus;
    a humidification-dehumidification desalination apparatus fluidically connected to the ion-removal apparatus and configured to remove water from an aqueous stream received by the desalination apparatus to produce a concentrated saline stream enriched in a dissolved monovalent salt relative to the aqueous stream received by the desalination apparatus;
    a precipitation apparatus fluidically connected to the humidification-dehumidification desalination apparatus, the precipitation apparatus configured to receive at least a portion of the concentrated saline stream output by the humidification-dehumidification desalination apparatus and to precipitate at least a portion of the dissolved monovalent salt from the concentrated saline stream to produce a product stream containing less of the dissolved monovalent salt relative to the concentrated saline stream and to produce precipitated monovalent salt comprising retained water from the concentrated saline stream; and
    a solids-handling apparatus fluidically connected to the precipitation apparatus, the solids-handling apparatus configured to remove at least a portion of the water retained by precipitated monovalent salt from the precipitation apparatus.

2. The system of claim 1, wherein the ion-removal apparatus comprises a chemical ion-removal apparatus.

3. The system of claim 1, wherein wherein the ion-removal apparatus comprises an electrocoagulation apparatus.

4. The system of claim 1, wherein the ion-removal apparatus comprises a resin bed.

5. They system of claim 1, wherein the humidification-dehumidification desalination apparatus is operated at a pressure below 1 atmosphere.

6. The system of claim 1, wherein the humidification-dehumidification desalination apparatus comprises a dehumidifier comprising a bubble column condenser.

7. The system of claim 1, wherein the humidification-dehumidification desalination apparatus comprises a bubble column humidifier.

8. The system of claim 1, wherein the concentrated saline stream is present within an outlet of the humidification-dehumidification desalination apparatus, and the concentrated saline stream has a density of from about 9 pounds per gallon and about 11 pounds per gallon.

9. They system of claim 1, wherein the precipitation apparatus comprises a low shear mixer.

10. The system of claim 1, wherein the precipitation apparatus comprises a vessel comprising a volume within which the concentrated saline stream is substantially quiescent.

11. The system of claim 10, wherein the substantially quiescent volume within the vessel occupies at least about 1% of the volume of the vessel.

12. The system of claim 10, wherein the substantially quiescent volume within the vessel occupies at least about 10% of the volume of the vessel.

13. The system of claim 10, wherein the vessel is a first vessel, and the precipitation apparatus further comprises a second vessel in which the solids precipitated in the first vessel are allowed to settle.

14. The system of claim 1, wherein the solids-handling apparatus is configured to produce a cake comprising at least a portion of the precipitated monovalent salt from the precipitation apparatus.

15. The system of claim 1, further comprising a transport device configured to transport precipitated monovalent salt away from the precipitation apparatus.

16. The system of claim 15, wherein the transport device comprises a pump.

17. The system of claim 15, wherein the transport device comprises a conveyor.

18. The system of claim 15, wherein the transport device is configured to transport the precipitated monovalent salt from the precipitation apparatus to the solids-handling apparatus.

* * * * *

UNITED STATES PATENT AND TRADEMARK OFFICE
CERTIFICATE OF CORRECTION

PATENT NO. : 9,969,638 B2
APPLICATION NO. : 14/452387
DATED : May 15, 2018
INVENTOR(S) : Prakash Narayan Govindan et al.

It is certified that error appears in the above-identified patent and that said Letters Patent is hereby corrected as shown below:

In the Claims

At Column 38, Claim 3, Line 12, the words "claim 1, wherein wherein the" should read --claim 1, wherein the--

At Column 38, Claim 5, Line 17, the words "They system of" should read --The system of--

At Column 38, Claim 8, Line 30, the words "gallon and about 11 pounds" should read --gallon to about 11 pounds--

At Column 38, Claim 9, Line 31, the words "They system of" should read --The system of--

Signed and Sealed this
Third Day of July, 2018

Andrei Iancu
*Director of the United States Patent and Trademark Office*